(12) United States Patent
Russell et al.

(10) Patent No.: US 10,277,635 B2
(45) Date of Patent: *Apr. 30, 2019

(54) CONTROL OF ACCESSES FOR IMS SERVICES

(71) Applicant: BlackBerry Limited, Waterloo (CA)

(72) Inventors: Nicholas James Russell, Newbury (GB); Adrian Buckley, Tracy, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,301

(22) Filed: Oct. 9, 2017

(65) Prior Publication Data

US 2018/0034860 A1 Feb. 1, 2018

Related U.S. Application Data

(63) Continuation of application No. 14/610,420, filed on Jan. 30, 2015, now Pat. No. 9,787,726.

(51) Int. Cl.
*G06F 15/173* (2006.01)
*H04L 29/06* (2006.01)

(52) U.S. Cl.
CPC ...... *H04L 65/1016* (2013.01); *H04L 65/1006* (2013.01); *H04L 65/1069* (2013.01)

(58) Field of Classification Search
USPC ................................. 709/225, 223, 230, 231
See application file for complete search history.

(56) References Cited

U.S. PATENT DOCUMENTS

| 9,319,827 B2 | 4/2016 | Liu et al. |
| 9,787,726 B2 | 10/2017 | Russell et al. |
| 2009/0201879 A1 | 8/2009 | Purkayastha et al. |
| 2010/0268763 A1 | 10/2010 | Rasanen |

(Continued)

FOREIGN PATENT DOCUMENTS

| EP | 2830364 A1 | 1/2015 |
| WO | 2014130091 A1 | 8/2014 |

OTHER PUBLICATIONS

3GPP TS 27.007 V12.7.0; 3rd Generation Partnership Project; Technical Specification Group Core Network and Terminals; AT Command Set for User Equipment (UE); Release 12; Dec. 2014; 319 pages.

(Continued)

*Primary Examiner* — Lan Dai T Truong
(74) *Attorney, Agent, or Firm* — Conley Rose, P.C.; J. Robert Brown, Jr.; Gayatry S. Nair

(57) ABSTRACT

A method for operating a UE is provided. The method comprises retrieving, by the UE, an IMS transport policy comprising a set of service transport rules. The set of service transport rules may include an indication of at least one IMS service and an indication of a policy for at least one access technology associated with the at least one IMS service. The indication of the policy may indicate whether the access technology can or cannot be used to transmit data between a network element and the UE when a first IP flow for a first IMS service associated with the UE has at least one IP flow characteristic in common with a second IP flow for a second IMS service associated with the UE, or whether the access technology is preferred over another access technology for transmitting data between the network element and the UE in such circumstances.

21 Claims, 16 Drawing Sheets

(56) References Cited

U.S. PATENT DOCUMENTS

| | | |
|---|---|---|
| 2011/0286395 A1 | 11/2011 | Liebsch et al. |
| 2012/0150521 A1 | 6/2012 | Balkwill |
| 2013/0012182 A1 | 1/2013 | Liao |
| 2013/0308620 A1 | 11/2013 | Bharadwaj |
| 2013/0322300 A1 | 12/2013 | Landais et al. |
| 2014/0029420 A1 | 1/2014 | Jeong et al. |
| 2014/0161026 A1 | 6/2014 | Stojanovski et al. |
| 2015/0188810 A1 | 7/2015 | Salkintzis |
| 2016/0150464 A1 | 5/2016 | Zhang et al. |

OTHER PUBLICATIONS

3GPP TS 23.228 V13.1.0; 3rd Generation Partnership Project; Technical Specification Group Services and System Aspects; IP Multimedia Subsystem (IMS); Stage 2; Release 13; Dec. 2014; 311 pages.

3GPP TS 24.341 V12.6.0; 3rd Generation Partnership Project; Technical Specification Group Core Network and Terminals; Support of SMS Over IP Networks; Stage 3; Release 12; Dec. 2014; 53 pages.

3GPP TS 31.102 V12.6.0; 3rd Generation Partnership Project; Technical Specification Group Core Network and Terminals; Characteristics of the Universal Subscriber Identity Module (USIM) Application; Release 12; Jan. 2015; 253 pages.

3GPP TS 31.103 V12.2.0; 3rd Generation Partnership Project; Technical Specification Group Core Network and Terminals; Characteristics of the IP Multimedia Services Identity Module (ISIM) Application; Release 12; Jul. 2014; 44 pages.

3GPP TS 24.008 V13.0.0; 3rd Generation Partnership Project; Technical Specification Group Core Network and Terminals; Mobile Radio Interface Layer 3 Specification; Core Network Protocols; Stage 3; Release 13; Dec. 2014; 705 pages.

3GPP TS 24.301 V13.0.0; 3rd Generation Partnership Project; Technical Specification Group Core Network and Terminals; Non-Access-Stratum (NAS) Protocol for Evolved Packet System (EPS); Stage 3; Release 13; Dec. 2014; 374 pages.

3GPP TS 23.203 V13.2.0; 3rd Generation Partnership Project; Technical Specification Group Services and System Aspects; Policy and Charging Control Architecture; Release 13; Dec. 2014; 230 pages.

3GPP TS 23.060 V13.1.0; 3rd Generation Partnership Project; Technical Specification Group Services and System Aspects; General Packet Radio Service (GPRS); Service Description; Stage 2; Release 13; Dec. 2014; 354 pages.

3GPP TS 36.300 V12.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 12; Dec. 2014; 251 pages.

3GPP TS 22.278 V13.2.0; 3rd Generation Partnership Project; Technical Specification Group Services and System Aspects; Service Requirements for the Evolved Packet System (EPS); Release 13; Dec. 2014; 46 pages.

3GPP TS 23.402 V13.0.0; 3rd Generation Partnership Project; Technical Specification Group Services and System Aspects; Architecture Enhancements for Non-3GPP Accesses; Release 13; Dec. 2014; 290 pages.

3GPP TS 24.312 V12.7.0; 3rd Generation Partnership Project; Technical Specification Group Core Network and Terminals; Access Network Discovery and Selection Function (ANDSF); Management Object (MO); Release 12; Dec. 2014; 371 pages.

3GPP TS 36.304 V12.3.0; 3rd Generation Partnership Project; Technical Specification Group Radio Access Network; Evolved Universal Terrestrial Radio Access (E-UTRA); User Equipment (UE) Procedures in Idle Mode; Release 12; Dec. 2014; 37 pages.

3GPP TS 36.331 V12.4.1; 3rd Generation Partnership Project; Technical Specification Group Radio Access Network; Evolved Universal Terrestrial Radio Access (E-UTRA); Radio Resource Control (RRC); Protocol Specification; Release 12; Dec. 2014; 410 pages.

3GPP TS 24.237 V12.7.0; 3rd Generation Partnership Project; Technical Specification Group Core Network and Terminals; IP Multimedia (IM) Core Network (CN) Subsystem; IP Multimedia Subsystem (IMS) Service Continuity; Stage 3; Release 12; Dec. 2014; 460 pages.

3GPP TS 24.216 V12.0.0; 3rd Generation Partnership Project; Technical Specification Group Core Network and Terminals; Communication Continuity Management Object (MO); Release 12; Sep. 2014; 26 pages.

3GPP TS 24.229 V13.0.0; 3rd Generation Partnership Project; Technical Specification Group Core Network and Terminals; IP Multimedia Call Control Protocol Based on Session Initiation Protocol (SIP) and Session Description Protocol (SDP); Stage 3; Release 13; Dec. 2014; 858 pages.

3GPP TS 23.401 V13.1.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 13; Dec. 2014; 310 pages.

3GPP TS 24.604 V12.5.0; 3rd Generation Partnership Project; Technical Specification Group Core Network and Terminals; Communication Diversion (CDIV) Using IP Multimedia (IM) Core Network (CN) Subsystem; Protocol Specification Release 12; Dec. 2014; 58 pages.

3GPP TS 24.167 V13.0.0; 3rd Generation Partnership Project; Technical Specification Group Core Network and Terminals; 3GPP IMS Management Object (MO); Stage 3; Release 13; Dec. 2014; 40 pages.

3GPP TS 22.228 V13.1.0; 3rd Generation Partnership Project; Technical Specification Group Services and System Aspects; Service Requirements for the Internet Protocol (IP) Multimedia Core Network Subsystem (IMS); Stage 1; Release 13; Sep. 2014; 51 pages.

3GPP TS 24.312 V12.4.0; 3rd Generation Partnership Project; Technical Specification Group Core Network and Terminals; Access Network Discovery and Selection Function (ANDSF); Management Object (MO); Release 12; Mar. 2014; 279 pages.

Rosenberg, J. et al.; "SIP: Session Initiation Protocol"; RFC 3261; Jun. 2002; 252 pages.

Rosenberg, J., et al.; "Indicating User Agent Capabilities in the Session Initiation Protocol (SIP)"; RFC 3840; Aug. 2004; 34 pages.

Perkins, C.; "IP Mobility Support for IPv4, Revised"; RFC 5944; Nov. 2010; 100 pages.

Perkins, C., et al.; "Mobility Support in IPv6"; RFC 6275; Jul. 2011; 169 pages.

Hilt, V.; "A Session Initiation Protocol (SIP) Event Package for Session-Specific Policies"; RFC 6795; Dec. 2012; 36 pages.

McCann, S., et al.; "Session Policy Framework using EAP"; IETF; draft-mccann-session-policy-framework-using-eap-07.txt; Jan. 8, 2013; 30 pages.

GSMA; "Official Document IR.92—IMS Profile for Voice and SMS"; Version 8.0; Apr. 22, 2014; 35 pages.

GSMA; "Official Document IR.94—IMS Profile for Conversational Video Service"; Version 8.0; Nov. 17, 2014; 18 pages.

Iana; "Protocol Numbers"; http://www.iana.org/assignments/protocol-numbers/protocol-numbers.xml; Apr. 15, 2015; 10 pages.

Grossman, D.; "New Terminology and Clarifications for Diffserv"; RFC 3260; Apr. 2002; 10 pages.

Handley, M., et al.; "SDP: Session Description Protocol"; RFC 4566; Jul. 2006; 49 pages.

Office Action dated Jan. 3, 2017; U.S. Appl. No. 14/610,420, filed Jan. 30, 2015; 33 pages.

Notice of Allowance dated Jun. 6, 2017; U.S. Appl. No. 14/610,420, filed Jan. 30, 2015; 15 pages.

PCT International Search Report; Application No. PCT/GB2016/050158; dated Apr. 29, 2016; 6 pages.

PCT Written Opinion of the International Searching Authority; Application No. PCT/GB2016/050158; dated Apr. 29, 2016; 6 pages.

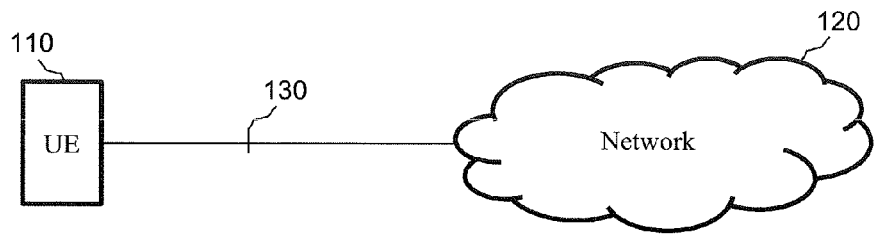

Figure 1

| |
|---|
| AddressType (e.g. IPv4, IPv6) |
| StartSourceIPaddress |
| EndSourceIPaddress |
| StartDestIPaddress |
| EndDestIPaddress |
| ProtocolType (e.g. those listed in IANA Assigned Internet Protocol Numbers, such as TCP, UDP) |
| StartSourcePortNumber |
| EndSourcePortNumber |
| StartDestPortNumber |
| EndDestPortNumber |
| QoS (DS (DiffServ) and ToS (Type of Service) values as described in IETF RFC 3260) |
| DomainName (that of the destination node, before it was resolved to an IP address) |

Figure 2

If service n° XX is "available", this file shall be present.
This EF contains the coding for n IMS Transport Policy sets where n is determined by the operator.

| Identifier: '6F61' | Structure: transparent | Optional |
|---|---|---|
| File size: 5n bytes , (n ≥ 8) | Update activity: low | |

Access Conditions:
    READ                    PIN
    UPDATE             ADM
    DEACTIVATE     ADM
    ACTIVATE       ADM

| Bytes | Description | M/O | Length |
|---|---|---|---|
| | Service Provider (highest priority) | O | |
| | Service Provider Access Priority | O | |
| | Service Provider Allowed / Prohibited | O | |
| : | RAT (highest priority) | O | |
| | RAT Priority | O | |
| | RAT Allowed / Prohibited | O | |
| | ServiceID | O | |
| | APN | O | |

Some possible encodings are below, additional encodings are possible.

Service Provider coding

- SSID

Contents:

- An SSID.

Coding:

- The SSID shall be encoded to an octet string according to UTF-8 encoding rules as specified in 3GPP TS 23.038 [x]. The tag value of the Realm TLV data object shall be '80'.

- Realm

Contents:

- A realm.

Coding:

- The FQDN shall be encoded to an octet string according to UTF-8 encoding rules as specified in IETF RFC 3629 [27]. The tag value of the Realm TLV data object shall be '81'.

- PLMN
  Contents:

-       Mobile Country Code (MCC) followed by the Mobile Network Code (MNC).
  Coding:

-       according to TS 24.008 [9]. The tag value of the Realm TLV data object shall be '82'

- Radio Access Technology Identifier: The tag value of the RAT identifier data object shall be '83'

Figure 7

Coding:
- 2 bytes are used to select the access technology where the meaning of each bit is as follows:
  - bit = 1: access technology selected;
  - bit = 0: access technology not selected.

Byte1:

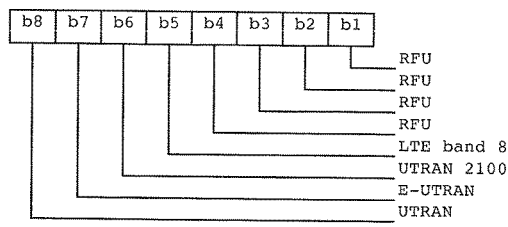

Byte 2:

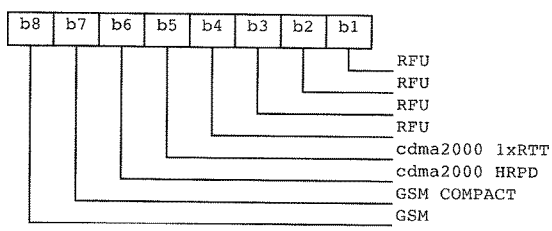

IARI TLV object tag value 84:
    Contents:
- The content and coding is defined below.

Coding of the IARI TLV objects

| Length | Description | Value | Status |
|---|---|---|---|
| 1 byte | IARI TLV TAG | '84' | M |
| 1 byte | Length of IARI | Y | M |
| Y bytes | IARI value | - | M |

- Coding:
    IMS Application Reference Identifier: shall be coded as specified in TS 24.229 [32].

Unused bytes shall be set to 'FF'.

ICSI TLV object tag value 85:
    Contents:
- The content and coding is defined below.

Coding of the ICSI TLV objects

| Length | Description | Value | Status |
|---|---|---|---|
| 1 byte | ICSI TLV TAG | '85' | M |
| 1 byte | Length of ICSI | Y | M |
| Y bytes | ICSI value | - | M |

- Coding:
    IMS ICSI: shall be coded as specified in TS 24.229 [32].

Unused bytes shall be set to 'FF'.

Figure 7, continued

| Coding of the APN TLV objects | | | |
|---|---|---|---|
| Length | Description | Value | Status |
| 1 byte | APN TLV TAG | 'DD' | M |
| 1 byte | Length of APN | Y | M |
| Y bytes | APN value | - | M |

APN TLV object tag value DD:

For contents and coding of APN-TLV values see TS 23.003 [25]..

- SIP method Identifier: The tag value of the SIP Method identifier data object shall be '84'
Coding:
- 1 byte is used to select the SIP METHOD where the meaning of each bit is as follows:
    - bit = 1: SIP METHOD selected;
    - bit = 0: SIP METHOD not selected.

Byte1:

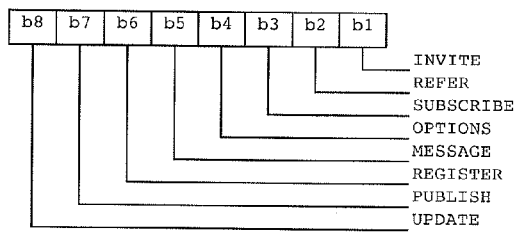

- Allowed /Priority Identifier: The tag value of the Allowed /Priority identifier data object shall be '85'
Coding:
- 1 byte is used to select the Allowed /Priority Identifier where the meaning of bit8 is as follows:
    -- bit 8= 1: Allowed;
    - bit 8 = 0: Not allowed.

Byte1:

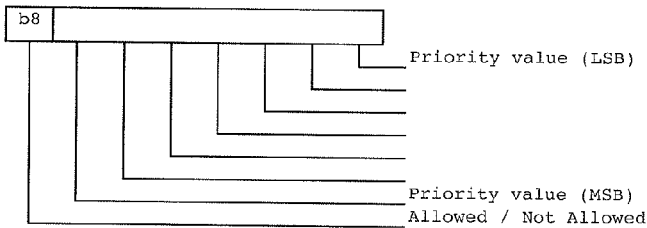

Figure 7, continued

| Network Node #1 | BSC, NodeB, eNodeB, HNodeB, HeNodeB, SGSN, GGSN, MSC, MME, GGSN, P-GW/PDN-GW, PDG, ePDG, HA, FA, AP, AAA Server, AAA Proxy, PDSN, PCRF/V-PCRF/H-PCRF, PCEF/V-PCEF/H-PCEF, BBERF, TDF, HSS, HLR, DNS Server, DHCP server, Policy Server, ANQP server, CSCF, SIP AS. |
|---|---|
| Network Node #2 | BSC, NodeB, eNodeB, HNodeB, HeNodeB, SGSN, GGSN, MSC, MME, GGSN, P-GW/PDN-GW, PDG, ePDG, HA, FA, AP, AAA Server, AAA Proxy, PDSN, PCRF/V-PCRF/H-PCRF, PCEF/V-PCEF/H-PCEF, BBERF, TDF, HSS, HLR, DNS Server, DHCP server, Policy Server, ANQP server, CSCF, SIP AS. |

Figure 9

| Message #1 | Attach Request, Location Area Update Request, Routing Area Update Request, Tracking Area update request<br>Activate PDP context Request<br>Modify PDP context Request<br>PDN connectivity request<br>Bearer resource modification request<br>ANQP request<br>CP-DATA<br>RP-DATA<br>HTTP client request e.g. GET<br>SIP (e.g. SUBSCRIBE)<br>AAA Message (e.g. EAP method) |
|---|---|
| Message #2 | Create PDP Context Request<br>Update PDP Context Request<br>Create Session Request<br>Create Bearer Request<br>Insert Subscriber Data Answer<br>Update Location Request<br>CC-Request<br>MAP-MT-Forward-Short-Message response/confirm<br>SIP (e.g. SUBSCRIBE)<br>AAA Message (e.g. EAP method) |
| Message #3 | Create PDP Context Response<br>Update PDP Context Response<br>Create Session Response<br>Create Bearer Response<br>Insert Subscriber Data Request<br>Update Location Answer<br>CC-Answer<br>MAP-MT-Forward-Short-Message request/indication<br>SIP (e.g. NOTIFY)<br>AAA Message (e.g. EAP response) |
| Message #4 | Attach Accept, Location Area Update Accept, Routing Area Update Accept, Tracking Area update accept<br>Activate PDP context accept/reject<br>Modify PDP context accept/reject<br>Modify EPS bearer context request<br>Activate default EPS bearer context request<br>ANQP response<br>CP-ACK<br>RP-ACK<br>HTTP client response<br>SIP (e.g. NOTIFY)<br>AAA Message (e.g. EAP response) |

Figure 10

23.6      RAN assisted WLAN interworking

This section describes the mechanisms to support traffic steering between E-UTRAN and WLAN.

23.6.1      General principles

This version of the specification supports E-UTRAN assisted UE based bi-directional traffic steering between E-UTRAN and WLAN for UEs in RRC_IDLE and RRC_CONNECTED.

E-UTRAN provides assistance parameters via broadcast and dedicated RRC signalling to the UE. The RAN assistance parameters may include E-UTRAN signal strength thresholds, WLAN channel utilization thresholds, WLAN backhaul data rate thresholds, WLAN signal strength, and Offload Preference Indicator (OPI) and IMS-based service/feature/function indicator. E-UTRAN can also provide a list of WLAN identifiers to the UE via broadcast signalling. The UE uses the RAN assistance parameters in the evaluation of:

- access network selection and traffic steering rules defined in TS 36.304 [11]; or
- ANDSF policies defined in TS 24.312 [58]

for traffic steering decisions between E-UTRAN and WLAN as specified in TS 23.402[19].

The OPI is only used in ANDSF policies as specified in TS 24.312 [58].

WLAN identifiers are only used in access network selection and traffic steering rules defined in TS 36.304 [11].

If the UE is provisioned with ANDSF policies it shall forward the received RAN assistance parameters to upper layers, otherwise it shall use them in the access network selection and traffic steering rules defined in section 23.6.2 and TS 36.304 [11]. The access network selection and traffic steering rules defined in section 23.6.2 and TS 36.304 [11] are applied only to the WLANs of which identifiers are provided by the E-UTRAN.

The UE in RRC_CONNECTED shall apply the parameters obtained via dedicated signalling if such have been received from the serving cell; otherwise, the UE shall apply the parameters obtained via broadcast signalling.

The UE in RRC_IDLE shall keep and apply the parameters obtained via dedicated signalling, until cell reselection/selection or a timer has expired since the UE entered RRC_IDLE upon which the UE shall apply the parameters obtained via broadcast signalling.

In the case of RAN sharing, each PLMN sharing the RAN can provide independent sets of RAN assistance parameters.

23.6.2      Access network selection and traffic steering rules

The UE indicates to upper layers when (and for which WLAN identifiers) access network selection and traffic steering rules defined in TS 36.304 [11] are fulfilled. The selection among WLANs that fulfil the access network selection and traffic steering rules is up to UE implementation.

When the UE applies the access network selection and traffic steering rules defined in TS 36.304 [11], it performs traffic steering between E-UTRAN and WLAN with APN granularity and/or IMS-based service/feature/function granularity i.e. when the UE moves traffic of a certain IMS-based service/feature/function to or from WLAN it shall move all of the traffic associated with that IMS-based service/feature/function.

Figure 13

23.6 RAN assisted WLAN interworking

This section describes the mechanisms to support traffic steering between E-UTRAN and WLAN.

23.6.1 General principles

This version of the specification supports E-UTRAN assisted UE based bi-directional traffic steering between E-UTRAN and WLAN for UEs in RRC_IDLE and RRC_CONNECTED.

E-UTRAN provides assistance parameters via broadcast and dedicated RRC signalling to the UE. The RAN assistance parameters may include E-UTRAN signal strength thresholds, WLAN channel utilization thresholds, WLAN backhaul data rate thresholds, WLAN signal strength and Offload Preference Indicator (OPI). E-UTRAN can also provide a list of WLAN identifiers and/or IMS-based service indicators (e.g. ICSI, IARI, feature tag, media feature tag, SDP, SDP desctiption, etc) to the UE via broadcast signalling.The UE uses the RAN assistance parameters in the evaluation of:

- access network selection and traffic steering rules defined in TS 36.304 [11]; or

- ANDSF policies defined in TS 24.312 [58]

for traffic steering decisions between E-UTRAN and WLAN as specified in TS 23.402[19].

The OPI is only used in ANDSF policies as specified in TS 24.312 [58].

WLAN identifiers are only used in access network selection and traffic steering rules defined in TS 36.304 [11].

If the UE is provisioned with ANDSF policies it shall forward the received RAN assistance parameters to upper layers, otherwise it shall use them in the access network selection and traffic steering rules defined in section 23.6.2 and TS 36.304 [11]. The access network selection and traffic steering rules defined in section 23.6.2 and TS 36.304 [11] are applied only to the WLANs of which identifiers are provided by the E-UTRAN.

The UE in RRC_CONNECTED shall apply the parameters obtained via dedicated signalling if such have been received from the serving cell; otherwise, the UE shall apply the parameters obtained via broadcast signalling.

The UE in RRC_IDLE shall keep and apply the parameters obtained via dedicated signalling, until cell reselection/selection or a timer has expired since the UE entered RRC_IDLE upon which the UE shall apply the parameters obtained via broadcast signalling.

In the case of RAN sharing, each PLMN sharing the RAN can provide independent sets of RAN assistance parameters.

23.6.2 Access network selection and traffic steering rules

The UE indicates to upper layers when (and for which WLAN identifiers) access network selection and traffic steering rules defined in TS 36.304 [11] are fulfilled. The selection among WLANs that fulfil the access network selection and traffic steering rules is up to UE implementation.

When the UE applies the access network selection and traffic steering rules defined in TS 36.304 [11], it performs traffic steering between E-UTRAN and WLAN with APN granularity and/or ICSI/IARI/feature tag/media feature tag/SDP/SDP description granularity i.e. when the UE moves traffic of/belonging to a certain ICSI/IARI/SDP/SDP description to or from WLAN it shall move all of the traffic associated with that ICSI/IARI/SDP/SDP description.

Figure 14

CONTROL OF ACCESSES FOR IMS SERVICES

CROSS-REFERENCE TO RELATED APPLICATIONS

This application is a continuation of U.S. patent application Ser. No. 14/610,420 filed Jan. 30, 2015 by Nicholas James Russell, et al. entitled, "Control of Accesses for IMS Services", which is incorporated by reference herein as if reproduced in its entirety.

BACKGROUND

The IP (Internet Protocol) Multimedia Subsystem (IMS) is a standardized architecture for providing multimedia services and voice-over-IP calls to both mobile and fixed user equipment (UE). The Session Initiation Protocol (SIP) has been standardized and governed primarily by the Internet Engineering Task Force (IETF) as a protocol for setting up and managing IMS-based calls. As used herein, the term "UE" can refer to mobile devices such as mobile telephones, personal digital assistants, handheld or laptop computers, and similar devices that have telecommunications capabilities. Such a UE might comprise a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might comprise the device itself without such a card. The term "UE" may also refer to devices that have similar capabilities but that are not transportable, such as fixed line telephones, desktop computers, or set-top boxes. The term "UE" can also refer to any hardware or software component that can terminate a SIP session.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is a diagram of a basic UE/network architecture according to an embodiment of the disclosure.

FIG. 2 illustrates IP filter information according to an embodiment of the disclosure.

FIG. 7 illustrates an example of data encoding on a UICC according to an embodiment of the disclosure.

FIG. 9 illustrates examples of network node implementations according to an embodiment of the disclosure.

FIG. 10 illustrates examples of message implementations according to an embodiment of the disclosure.

FIG. 13 is an example of standards text for 3GPP TS 36.300 according to an embodiment of the disclosure.

FIG. 14 is an alternative example of standards text for 3GPP TS 36.300 according to an embodiment of the disclosure.

DETAILED DESCRIPTION

Figure 3:
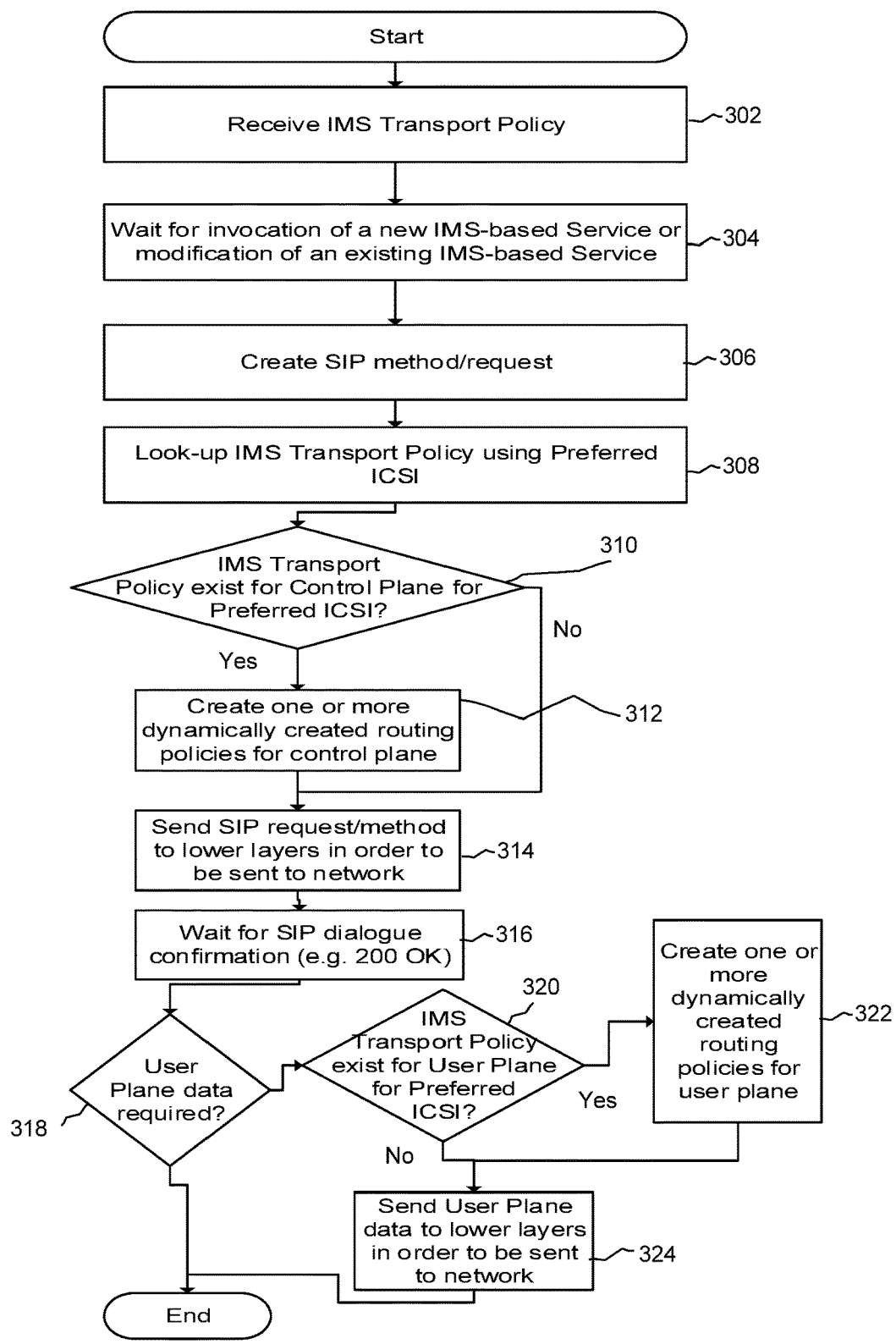
FIG. 3 is a flow diagram showing basic handling in a UE of IMS Transport Policy according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and figures, the acronyms below have the following definitions. Unless stated otherwise, all terms are defined by and follow the standards set forth by the Third Generation Partnership Program (3GPP) technical specifications or by the OMA (Open Mobile Alliance).

1×RTT 1× (single-carrier) Radio Transmission Technology
3GPP 3rd Generation Partnership Project
AAA Authentication, Authorisation and Accounting
ACK Acknowledge
ADS Access Domain Selection
ANDSF Access Network Discovery and Selection Function
ANQP Access Network Query Protocol
AP Access Point
APN Access Point Name
AS Application Server
AT ATtention
BBERF Bearer Binding and Event Reporting Function
BSC Base Station Controller
BSSID Basic Service Set Identifier
BTS Base Transceiver Station
CDIV Communication Diversion
CSCF Call/Session Control Function
DHCP Dynamic Host Configuration Protocol
DM Device Management
DNS Domain Name System
DSL Digital Subscriber Line
EAP Extensible Authentication Protocol
EPC Evolved Packet Core
ePDG Evolved Packet Data Gateway
EPS Evolved Packet System
ESSID Extended Service Set Identifier E-UTRAN Evolved Universal Terrestrial Access Network
FQDN Fully Qualified Domain Name
GERAN GPRS EDGE Radio Access Network
GGSN Gateway GPRS Support Node
GPRS General Packet Radio Service
GRUU Globally Routable User Agent URI
GSM Global System for Mobile telecommunication
GTP GPRS Tunnelling Protocol
H-PCEF Home network PCEF
H-PCRF Home network PCRF
HLR Home Location Register
HPLMN Home PLMN
HRPD High Rate Packet Data
HSS Home Subscriber Server
HTTP Hyper Text Transfer Protocol
I-CSCF Interrogating Call/Session Control Function
IANA Internet Assigned Numbers Authority
IARI IMS Application Reference Identifier
IARP Inter-APN Routing Policy
IBCF Interconnection Border Control Function
ICSI IMS Communication Service Identifier
IEEE Institute of Electrical and Electronic Engineers
IEI Information Element Identity
IETF Internet Engineering Task Force
IFOM IP Flow Mobility
IMAP Internet Message Access Protocol
IMS IP Multimedia (core network) Subsystem
ISIM IMS SIM
ISRP Inter-System Routing Policy
ITU International Telecommunication Union
LDAP Lightweight Directory Access Protocol
LED Light Emitting Diode
LSB Least Significant Bit
LTE Long Term Evolution
MAP Mobile Application Part
MAPCON Multi Access PDN Connectivity
MCC Mobile Country Code
MME Mobile Management Entity
MMTel Multimedia Telephony
MNC Mobile Network Code
MSB Most Significant Bit
MSC Mobile services Switching Centre
MSRP Message Session Relay Protocol
MT Mobile Terminated or Mobile Termination
NAI Network Access Identifier
NAS Non-Access Stratum
NFC Near-Field Communication
NSAPI Network (Layer) Service Access Point Identifier
NSWO Non-Seamless Wireless Off-load
OMA Open Mobile Alliance
OPI Operator Preference Indicator
OPIIS Operator Policies for IP Interface Selection
OS Operating System
OTA Over the Air
P-CSCF Proxy Call/Session Control Function
P-GW/PDN-GW Packet Data Network Gateway
PCEF Policy and Charging Enforcement Function
PCRF Policy and Charging Rules Function
PDG Packet Data Gateway
PDN Packet Data Network
PDP Packet Data Protocol
PDSN Packet Data Serving Network
PIN Personal Identity Number
PLMN Public Land Mobile Network
QoS Quality of Service
QCI QoS Control Identifier
R-UIM Removable User Identity Module
RADIUS Remote Authentication Dial-In User Service
RAM Random Access Memory
RAN Radio Access Network
RAT Radio Access Technology
RAU Routing Area Update
RFC Request for Comments
RFU Reserved for Future Use
RNC Radio Network Controller
RRC Radio Resource Control
RTCP Real-Time Control Protocol
RTP Real-Time Protocol
RTT Real-Time Text
S-CSCF Serving Call/Session Control Function
S-GW Serving Gateway
SBC Session Border Controller
SCTP Stream Control Transmission Protocol
SDP Service Description Protocol
SGSN Serving GPRS Support Node
SIB System Information Block
SID Service Indication Data
SIM Subscriber Identity Module
SIP Session Initiation Protocol
SMS Short Message Service
SOAP Simple Object Access Protocol
SQL Sequence Query Language
SSID Service Set Identification
TA Terminal Adaptor
TAU Tracking Area Update
TCP Transmission Control Protocol
TDF Traffic Detection Function
TE Terminal Entity
TID Transport Indication Data
TLV Tag Length Value
ToS Type of Service
TS Technical Specification
UDP User Datagram Protocol
UE User Equipment
UICC Universal Integrated Circuit Card
UMTS Universal Mobile Telephony System
URI Uniform Resource Identifier
USB Universal Serial Bus
USIM UMTS SIM
USSD Unstructured Supplementary Service Data
UTRA UMTS Terrestrial Radio Access
UTRAN UMTS Terrestrial Radio Access Network
V-PCEF Visited network PCEF
V-PCRF Visited network PCRF
ViLTE Video (over IMS) over LTE
VoLTE Voice (over IMS) over LTE
VPLMN Visited PLMN
WLAN Wireless Local Area Network
XCAP XML Configuration Access Protocol
XML eXtensible Mark-up Language As used throughout the specification, claims, and figures, the terms below have the following definitions.

AAA Proxy An entity that forwards AAA protocol signalling between two or more entities e.g. other AAA Proxies, AAA Servers, etc. Typical protocols used are RADIUS and Diameter.

AAA Server An entity that terminates AAA protocol signalling and may provide responses to requests. Typical protocols used are RADIUS and Diameter.

Access Point An entity that terminates AAA protocol signalling and may provide responses to requests. Typical protocols used are RADIUS and Diameter.

Access Technology Examples of access technologies include, but are not necessarily limited to, mobile/ cellular (e.g. 2G/GERAN, 3G/UTRAN, 4G/LTE/E-UTRAN, CDMA, CDMA2000, etc.), Wi-Fi/WLAN (e.g. IEEE 802.11-based technologies, etc.), Bluetooth, NFC, WiMAX, Wireless Charging/Chargers, Ethernet, cable modem, DSL, Fibre, USB, Wireless USB, etc.

Control Plane Data Also known as "Signalling plane data", or even just "control plane" and "signalling plane", this includes all SIP methods/messaging, XCAP request and response messages, and IMAP messaging.

Network Identity A PLMN code (e.g. Mobile Country Code (MCC) and Mobile Network Code (MNC)), a WLAN identity (e.g. SSID/ESSID/BSSID), an NAI, etc.

User Plane Data Also known as "Media plane data", or even just "user plane" and "media plane", this includes all RTP, RTCP and MSRP messaging/data.

IMS-based services are initiated and released using control plane signaling or data. Control plane signaling may comprise SIP request methods such as INVITE or MESSAGE. Control plane signaling may be used to send data (e.g., an SMS message) and/or to establish user plane signaling or data. User plane signaling may comprise protocols such as RTP, RTCP, or MSRP, which in turn may be used to carry media, such as IMs (e.g., text), audio data (e.g., voice or music) and/or visual data (e.g., pictures, images, or video). Both control plane signaling and user plane signaling are transported in IP flows, which comprise IP datagrams (and possibly a transport protocol such as UDP, TCP, or SCTP) that are routed through one or more IP networks according to the IP datagram's IP header parameters (hereinafter also referred to as IP flow characteristics).

An IMS infrastructure may include a UE and an IMS network. The UE may comprise a UICC and a mobile equipment (ME). The UICC may host one or more applications that the ME can utilize, such as a SIM, a USIM, and/or an ISIM. The ME may also be abstracted (e.g., for the definition of AT commands) into three further components: a TE, an MT, and a TA, e.g., described in 3GPP TS 27.007. A UE may support AT commands, e.g., as specified in 3GPP TS 27.007.

IP flows between a UE and a network may be transported using different radio access technologies and/or PDN Connections, which may be identified by APNs. PDN Connections may also be referred to as PDP Contexts.

A basic UE-network architecture is depicted in FIG. 1. A UE 110 is connected to a network 120 via an interface 130 or "reference point". The network 120 may comprise an access network and a core network. The access network may host nodes that provide a RAN between the UE 110 and the network 120. Examples of such nodes include a NodeB, an eNodeB (eNB), a BTS, a BSC, an RNC, and an access point. The core network may comprise a PS core network and an IMS network. A PS core network may comprise PS nodes, such as an SGSN, a GGSN, an MME, an S-GW, a P-GW, an ePDG, or an HSS/HLR. An IMS network may comprise IMS-related nodes, such as a P-CSCF, an I-CSCF, an S-CSCF, an HSS, an AS, or an SBC/IBCF.

The reference point used between a UE and an IMS network is known as the "Gm" reference point. However, other interfaces between a UE and an IMS network may exist and may be used to support that reference point and other reference points from the UE to functions within the network.

A UE may have the capability to connect to one or more types of networks, such as a mobile/cellular system (e.g., 3GPP or CDMA200), WLAN/Wi-Fi, Bluetooth, USB, WiMAX, Ethernet, xDSL, or cable. The UE may have the capability to be connected to two or more types of networks simultaneously, e.g., mobile/cellular and WLAN.

In a 3GPP mobile/cellular system, the UE connects to a mobile/cellular network (e.g., after performing an attach or registration procedure and optionally any authentication, authorization, and/or security procedures) to transport IP flows by setting up a data connection, such as a PDP Context or a PDN Connection. In some mobile/cellular systems (e.g., LTE/E-UTRAN), a data connection is established as part of the "attach" procedure.

In a WLAN system, the UE connects to a WLAN to transport IP flows by performing a registration or association procedure with an access point and performing any relevant authentication, authorization, accounting and security-related procedures.

One or more policies may be used by UEs that optionally have simultaneously active modes of operation, that is, UEs capable of having two or more active data connections to two or more networks simultaneously. Such connections may be over one or more different access technologies. Similarly, a network that has two or more active data connections simultaneously to a UE may use one or more policies to decide what access technology and/or PDN Connection is allowed, prohibited, or preferred. A policy may contain one or more rules that indicate IP flow characteristics and one or more allowed, preferred, or prohibited access technologies and/or PDN Connections (which may be identified by APNs) that are to be used or not be used to transport IP flows matching the criteria. An example of this feature is described in 3GPP TS 22.278 and is called "IP Flow Mobility".

The ANDSF framework is specified by 3GPP (e.g., in 3GPP TS 23.402 and 3GPP TS 24.312), and its architecture may comprise one or both of a functional entity in the home network (e.g., ANDSF-H) and a functionality entity in the current visited cellular network/VPLMN (e.g., V-ANDSF) that can provide the UE with one or more rules (also known as "policies" or just "policy"). The UE may be configured with policies dynamically (e.g., via a server in a carrier network acting as an H-ANDSF or V-ANDSF) and/or statically (e.g., at the time of manufacture or the time of firmware or OS loading).

ANDSF policies relate to different features, including what accesses and/or what APNs to use for what IP flows. ISRP and IARP are two examples of policies that are provided by the ANDSF framework. ISRP is a set of operator-defined rules that determine how the UE should route IP traffic across multiple radio access interfaces. IARP is a set of operator-defined rules that determine which traffic should be routed across different PDN connections as well as which traffic should be non-seamlessly offloaded to a WLAN (known as NSWO).

The ANDSF framework enables identification of IP traffic to be routed using the criteria defined in the ANDSF MO (e.g., as defined in 3GPP TS 24.312). The current criteria are shown in FIG. 2. The ANDSF framework enables identification of access networks, and in turn, data connections over those access networks, that may be used or not used to route IP flows matching the criteria of FIG. 2.

The RAN Rules framework (as specified in 3GPP TS 36.300, 3GPP TS 36.304, and 3GPP TS 36.331) allows the visited cellular network (VPLMN) to which a UE is currently attached to provide indications to the UE if or when to "off-load" or "steer" IP flows, data, or traffic. Only IP flows belonging to a PDN connection for a particular APN can be offloaded to a WLAN if the traffic is currently E-UTRAN or UTRAN and the UE has received an indication that the traffic using the PDN Connection or PDP Context associated with the APN can be offloaded. The framework can also provide indications for the reverse case, i.e., when to use 3GPP access technology to transport IP flows belonging to a PDN Connection or PDP Context associated with the APN.

Indications as to whether a PDN Connection or a PDP Context can be off-loaded via a WLAN are provided by the MME to the UE via NAS messages. If conditions are met, the UE then off-loads all EPS bearers belonging to the same PDN Connection (a received PDN Connection may comprise more than one EPS bearer) via the WLAN. An indication of an operator or carrier preference for off-load via the WLAN for the user (i.e., an OPI) may also be provided.

The IMS provides a system allowing operators to deploy media-rich services to their subscribers or users. The subscriber's or user's device (UE) and the operator's network may both have to support a certain set of protocols, codecs, and other functionality. For example, both the network and the UE may need to be IMS-enabled.

After a data connection has been established between the UE and the network, the UE may perform an IMS registration with an IMS network, for example by sending a SIP REGISTER method to the network. A registration with the IMS network enables the UE to then be able to initiate and receive sessions, calls (e.g., voice or audio calls or video calls), and messages (e.g., SMS, USSD, or IM). Calls/sessions may be set up by use of SIP methods, e.g., INVITE, which may contain SDP. SDP describes multimedia sessions for the purposes of session announcement, session invitation, and other forms of multimedia session initiation. SDP may also be described as negotiating the media that will be used on the user plane of the call/session.

If a UE has more than one data connection connected (e.g., a PDN Connection over E-UTRAN and a WLAN association), the UE may perform multiple registrations, i.e., one for each data connection. The UE may detect that it has multiple data connections due to having more than one IP address assigned or active. Thus, the UE may register to IMS for one or all of the IP addresses assigned to the UE. A data connection over which a UE has successfully registered to an IMS network will hereinafter be referred to as an IMS connection.

If a UE is registered over multiple IMS connections, then the UE and the IMS network can choose an IMS connection over which to establish and terminate new calls/sessions. In addition, if a UE is registered over multiple IMS connections, the UE and/or the IMS network may also be able to move existing IMS calls/sessions from one IMS connection to another (e.g., as defined in 3GPP TS 24.237). Such movement is referred to as IMS service continuity (IMS SC). IMS SC enables identification of calls/sessions to be handed over from one IMS connection to another IMS connection using the Communication Continuity MO as defined in 3GPP TS 24.216. SDP may identify the IMS calls/sessions that can be handed over. Such SDP may comprise a Media Type, as defined in IETF RFC 4566, which may comprise: "audio", "video", "text", "application", and "message". The Communication Continuity MO may be used, among other things, for Voice Call Continuity (i.e., the handing over of IMS calls/sessions that carry only voice or audio) and Service Continuity (i.e., the handing over of any type of IMS call/session, e.g., voice, video, or IM). The Communication Continuity MO identifies IMS connections to which calls/sessions may or may not be handed over by reusing the "access-type" field defined for the P-Access-Network-Info header, as defined in 3GPP TS 24.229.

ADS may be used by a UE or network to route a call (e.g., voice or video) from a UE and/or to a UE. ADS may be used to determine whether to route calls via SIP/IMS or via the CS domain.

T-ADS is used by the network to decide how to route or deliver a call to a UE. T-ADS consists of routing incoming calls destined to the UE to a function within the network (e.g., a SIP AS such as a Service Centralization and Continuity (SCC) AS). The network function then decides what accesses are available to route the call to the UE. The decision may take into account such factors as CS availability (e.g., the UE has attached to an MSC and has not missed a periodic Location Area Update); the time of the last Location Area Update; SIP/IMS availability (e.g., the UE has performed a successful SIP/IMS registration and has not missed a periodic re-registration); the time of the last SIP/IMS registration; the capability of the underlying technology conveyed to the UE during a SIP/IMS registration (e.g., if the UE has received an indication that voice is supported, for instance in a Tracking Area Update (TAU) Accept message or in a Routing Area Update (RAU) Accept message); the time of last TAU or RAU; and/or some operator-specific and non-standardized policy.

The UE may also support the T-ADS function by always performing (e.g., regardless of such functions as Idle Mode Signaling Reduction (ISR) as described in 3GPP TS 23.401) a TAU or RAU after moving from a voice-capable 3GPP RAT to a voice-incapable 3GPP RAT and, vice versa, when moving from a voice-incapable 3GPP RAT to a voice-capable 3GPP RAT. The RAU or TAU is performed in the new/moved-to 3GPP RAT and ensures that the 3GPP core network always has the most up-to-date information as to what 3GPP RAT type the UE is currently residing on, e.g., E-UTRAN or UTRAN.

The 3GPP MMTel CDIV feature (e.g., as specified in 3GPP TS 24.604) controls redirection and rerouting of UE-destined calls/sessions in the destination IMS network of a call/session of type voice, video, or RTT telephony (e.g., as defined in ITU-T Recommendation T.140). CDIV comprises a suite of services that includes, among other services, Communication Forwarding Unconditional, wherein all incoming calls/sessions are routed to a new end point identified by a SIP URI or Tel URI; Communication Forwarding on Not Reachable, wherein all incoming calls/sessions to the destination UE are routed to a new end point identified by a SIP URI or Tel URI when the UE is not IMS/SIP registered; and Communication Forwarding on No Reply, wherein all incoming calls/sessions to the destination UE are routed to a new end point identified by a SIP URI or Tel URI when the UE fails to respond to an incoming call/session, such as when the user does not answer the incoming call/session on the UE before a certain time elapses.

UEs may also be remotely provisioned with IMS-related policy via the IMS MO, e.g., as specified in 3GPP TS 24.167. This MO consists of many parameters that can be managed for IMS, including the basic IMS framework (e.g., as defined in 3GPP TS 23.228 and 3GPP TS 24.229) and SMS over IMS/IP networks (e.g., as defined in 3GPP TS 24.341). The IMS MO can contain a list of ICS's that identify an IMS Communication Service (e.g., MMTel or VideoCall). Stored against each ICSI in the list is an indication of whether or not the UE shall attempt to initiate resource allocation (i.e., whether the UE attempts to set up a dedicated EPS bearer or secondary PDP Context) for the media controlled by IMS when a certain ICSI value is used for the IMS call/session. In addition, the IMS MO contains two leaves entitled "Voice_Domain_Preference_E_UTRAN" and "Voice_Domain_Preference_UTRAN", which are used to indicate whether or not the UE attempts to initiate IMS voice calls/sessions over E-UTRAN and UTRAN, respectively, and whether CS or IMS is preferred when attempting to initiate and/or receive voice calls/sessions over E-UTRAN and UTRAN, respectively. Furthermore, the IMS MO can indicate whether the UE is prohibited from invoking SMS over IMS or if the use of the IMS for SMS is preferred, e.g., as controlled by the "SMS_Over_IP_Networks_Indication" leaf.

The embodiments disclosed herein address at least two problems that may arise in the above-described scenarios. First, it may not be possible to route IP flows from different IMS services over different access technologies if those component IP flows have common IP flow characteristics such as those listed in FIG. 2. Second, it may not be possible to route all IP flows belonging to a single IMS service over a common access technology if one or more of the IP flows have IP flow characteristics in common with an IP flow from a different IMS service that is routed over a particular access technology.

Regarding the first problem, it is possible that two or more different IMS-based services can have similar or undistinguishable IP flow characteristics. Since only IP flow characteristics are used by existing policy (e.g., ANDSF or RAN Rules) for choosing what access technology and/or APN to use to transport IP flows, operators are restricted to choosing the same access technology and/or APN for the two or more different IMS-based services. For example, an IMS-based Push-To-Talk service and an IMS-based voice calling (e.g., voice telephony) service may both comprise an IP flow for audio media. It is possible and not easily preventable that the IP flows for the audio media of both services could have the same IP flow characteristics. (Mandating, e.g., that IP flow characteristics must be different for different IMS-based services might be unrealistic and artificially restricts the IMS-based services' capabilities.) In such case, it may not be possible for the operator to specify that all media related to the IMS-based Push-To-Talk service should use a less expensive and potentially higher delay access technology (e.g., WLAN), and that all media related to the IMS-based voice call service should use a more expensive, lower latency, QoS-capable access technology (e.g., E-UTRAN) that is more appropriate for delay-sensitive services.

Regarding the second problem, an IMS-based service may have two or more IP flows, and the characteristics of at least one of the IP flows may be the same as the characteristics of an IP flow of another IMS-based service. For example, the following two IMS-based services may exist: (1) an IMS-based video calling service that consists of a first IP flow for video media and a second IP flow for audio media and (2) an IMS-based voice calling service that consists of an IP flow for audio media. It is possible and not easily preventable that the IP flow for the audio media of both the video calling service and the voice calling service could have the same IP flow characteristics. (Mandating, e.g., that IP flow characteristics must be different for different IMS-based services might be unrealistic and artificially restricts the IMS-based services' capabilities.) In such case, it may not be possible for the operator to specify that all media related to the IMS-based video call service should use a less expensive but large-bandwidth access technology (e.g., WLAN), and that all media related to the IMS-based voice call service should use a more expensive but more QoS-capable access technology (e.g., E-UTRAN).

Transporting different IP flows of an IMS-based service via different accesses and/or PDN connections may lead to one or more of the following issues. First, latency issues may occur. That is, the packets in a first flow may suffer a higher latency than packets in a second flow, and hence additional buffering may be needed to cover the first flow of packets. Also, audio may become out of sync with the visual part of a video service (e.g., lip-sync issues may occur) due to the different characteristics of the two access technologies and/or PDN Connections. Also, a new requirement may be placed on the video service client application to augment data from two different sources (or "lower layers" of the UE). Also, billing issues may arise for the end user. That is, the user may be billed differently for the different types of access used and thus may receive unexpected charges on a bill from the service provider or carrier. For example, a user may be billed on a per byte basis on a first access or PDN Connection and may be billed on a per service basis (e.g., the duration of a video call) on a second access or PDN Connection. Additional issues may also arise.

The ANDSF MO defined in 3GPP TS 24.312 may not be suitable for addressing the above issues. That is, identifying IP flows based only on one or more items of the IP filter information listed in FIG. 2 may not overcome the problems that may arise due to two or more IP flows having the possibility of being part of two different services.

In particular relation to the ProtocolType, StartDestPortNumber, and EndDestPortNumber, the ProtocolType uses a defined and well-known set of values (e.g., 6=TCP, 17=UDP, etc.), while the values of the StartDestPortNumber and EndDestPortNumber for IMS media streams are negotiated in the SDP in SIP during SIP session establishment. For instance, for media streams utilizing RTP (which utilizes UDP), media streams can use any UDP port number but typically any UDP port number between 1024 and 65535 (sometimes referred to as the "UDP unprivileged ports"). Thus, uniquely identifying the media streams for one particular service at the IP layer is only possible after the SIP session has successfully been established. In other words, it may not be possible to uniquely identify IMS media streams that use RTP for a particular IMS-based service using the IP filter criteria in FIG. 2 before SIP session establishment of the IMS-based service. This in turn means that a carrier or operator cannot remotely provision a UE to reliably identify media streams for a particular IMS-based service using existing provisioning methods, since existing provisioning methods commonly are incapable of provisioning a UE, during an IMS-based service call/session set-up or modification, with data that is valid only for that call/session.

In particular relation to the QoS IP filter information, differentiation between some IMS-based services may be achieved by configuring IP flows based on the QoS attribute in IP. However, since the QoS attribute is limited to DiffServ (which defines a set of code points to be used in the ToS header field of IPv4 datagrams and the Service Class header field of IPv6 datagrams), this may not be sufficient to differentiate between all IMS-based services, since there is no guarantee that IP flows belonging to two different IMS-based services will have different DiffServ settings in the IP datagram's ToS (as found in IPv4) or Service Class (as found in IPv6) IP datagram header field.

Within 3GPP, the use of QCI values in place of DiffServ values in the QoS attribute has been discussed. However, among other issues with this approach, the same issue as for using DiffServ values may apply if QCI values instead of DiffServ values were used in the ToS and Service Class IP datagram header fields. Moreover, since IP flows relating to voice-only service use only one QCI value (a value of 1), and IP flows relating to a combined audio and video service use two QCI values (a value of 1 for the audio part and a value of 2 for the video part), steering IP flows for voice to a different access or PDN Connection from the IP flows for video could cause the audio media and the video media of the video service to be transported over different access technologies or PDN Connections. Such a difference may lead to a number of issues, as discussed above, due to the different characteristics of the two access technologies and/or PDN Connections.

In addition, the ANDSF framework allows identification of IP flows in the UE based on the OS application ("app") identifier ("ID") of the UE-internal application that is originating and terminating a particular IP flow. A drawback relating specifically to differentiating IP flows based on OS app ID is that the values assigned to OS app IDs are not standardized and can differ between different operating systems of UEs. OS app IDs are also subject to change. For example, a new version of an app may be assigned a new value for its OS app ID. Furthermore, only the UE knows the OS app ID. That is, the ID is not communicated in signaling or messaging to or from the UE. Therefore, any external party to the UE (e.g., a carrier) may have difficulty in discovering the OS app ID that is originating and terminating IP flows, which in turn makes any configuration of which access each OS app should use very difficult.

Also, for EPC-connected access networks (e.g., EPC-connected Wi-Fi or EPC-connected WLAN), the APN that is to be used to route IP flows (which in itself is assigned traffic by the aforementioned IP-related characteristics and OS app ID) can be used.

It may be noted that, today, when data connections on a cellular network and on an EPC-connected WLAN are available to a UE, seamless wireless offload may occur (such handovers may also occur in other situations). However, the same drawbacks described above with respect to using IP flow characteristics and OS app ID may apply in such cases, since IP flow characteristics and/or OS app ID are used to decide which IP flows are to be transported over which PDN Connection.

The Communication Continuity MO defined in 3GPP TS 24.216 may also be unsuitable for addressing the issues described above. The Communication Continuity MO currently only defines what data connections can be used to hand over existing IMS calls/sessions. That is, this MO does not influence which data connection is used to initiate an IMS call/session. An operator that wants to use this MO for controlling what access a UE uses only for call/session initiation may be forced to populate fields for handover regardless of whether or not the operator wants to manage handover or whether or not the operator wants to request or implement non-standard behavior or functionality on the UE. Another drawback of using this MO may be that this MO uses SDP to identify IMS calls/sessions, which can make the MO long and convoluted. Yet another drawback of using this MO may be that there can be overlaps or conflicts between IMS calls/sessions that can be handed over as identified using this MO and IP flows identified using the ANDSF MO. Currently, such conflicts are assumed to be avoided by careful operator configuration. However, since an H-ANDSF and V-ANDSF can provide policy to the UE, there is a greater risk of policy conflicts due to the HPLMN having to ensure its policy does not conflict with all of its VPLMN roaming partners and vice versa.

The IMS MO defined in 3GPP TS 24.167 may also be unsuitable for addressing the issues described above. The IMS MO only provides control for access transport for voice and SMS. For voice, this is limited to only IMS versus CS when the current access technology is only E-UTRAN or UTRAN. For SMS, this is limited only to whether to attempt using IMS or not (e.g., preferring SMS over PS, SMS over CS, and/or SMS over SGs to SMS over IMS). Furthermore, despite the IMS MO being able to hold a list of ICS's, the only indication associated with the ICS's is an indication as to whether or not to make an attempt to initiate resource allocation for the media controlled by IMS.

MMTel CDIV may also be unsuitable for addressing the issues described above. CDIV is a feature that is used solely by a terminating network (i.e., the home network of a destination UE) within a call/session. That is, CDIV is limited only to MT sessions in the MT network and is further limited in that it only applies for voice calls, video calls, and RTT. In addition, CDIV is unable to cope with redirecting calls/sessions on conditions related to access technology. For example, CDIV is unable to redirect calls/sessions over specific accesses. Instead, CDIV just redirects incoming calls/sessions to a specific target (e.g., a SIP URI or a Tel URI) unconditionally, based on conditions of the user's availability/reachability or at the user's request such as upon the UE alerting the user to an incoming call/session.

ADS may also be unsuitable for addressing the issues described above. ADS is currently limited only to voice and video calls and can only be used to select between CS and IMS. That is, ADS cannot be used to select between different IMS connections or data connections. Hence, ADS cannot be used to select between different accesses used for IMS data.

IP flows can also be managed using the "RAN Rules" framework, but RAN Rules may be unsuitable for addressing the issues described above. A first drawback of using the RAN Rules framework as currently defined is that this framework is limited only to data connections via E-UTRAN, UTRAN, and WLAN. In addition, this framework off-loads all IP flows relating to specific APNs. That is, this framework performs traffic steering between E-UTRAN/UTRAN and WLAN with only an APN granularity, i.e., steers all EPS bearers belonging to the same APN. APN selection is based on IP parameters, and therefore the restrictions discussed above with regard to the ANDSF MO may also apply to the RAN Rules framework. A second drawback to using the RAN Rules framework is that the UE must be connected to a cellular network to receive the necessary steering or routing information. In other words, in the absence of a data connection to a cellular network, this solution does not function.

One or more embodiments are disclosed herein that may address the issues discussed above. In an embodiment, a UE is provisioned with or receives an IMS Transport Policy. The IMS Transport Policy may contain an IMS Service Identifier, such as an ICSI (preferred), an IARI (which may identify an application that uses one or more IMS services), and/or SDP. Additionally or alternatively, the IMS Transport Policy may specify allowed and/or prohibited/barred radio access technologies and/or APNs, with an indication of preference or order if there are multiple instances. A special or reserved value may be used to indicate all possible radio access technologies and/or APNs.

In addition to the above, the IMS Transport Policy may provide an indication of whether one or both of the IMS control plane and IMS user plane data are applicable. Such an indication may also be provided implicitly by the absence of a specific indication.

As part of the transport policy provisioning, a UE may receive a list of services to which transport policies apply. If a service is not listed, then the UE is permitted to use any UE-determined transport without regard to the presence or absence of a transport policy for that service. Such permission may ensure continued use of proprietary services that are not standardized and/or known to operators.

In addition, the IMS Transport Policy may include an indication that the IMS Transport Policy shall take priority over other, existing transport or routing policies already present on the UE, such as those that may have been provisioned on the UE using existing methods (e.g., OMA DM or SIM OTA). Such existing policies may include, for example, ISRP and/or IARP.

The IMS Transport Policy may be provided in response to a UE initiating a service, such as in a case where the network has not already indicated that the service is subject to a policy. In this case, for example, the IMS Transport Policy may be provided responsive to the initiation to indicate that the UE should use a specific policy for the initiated service. The policy may be determined based on the identification of specific codecs (e.g., video codecs) in the SDP signaling messages.

A UE may invoke an IMS-based service (e.g., call initiation or session initiation) or modify an existing IMS-based service for various reasons, such as due to end user interaction with the UE, an AT command being issued to the UE, etc. Responsive to such an invocation or modification, several steps may be taken. First, the UE may create a relevant SIP request method (e.g., INVITE or MESSAGE) to initiate an IMS-based service. Second, the UE may look up and retrieve an IMS Transport Policy using the preferred ICSI (i.e., the ICSI included in the P-Preferred-Service header field) from the SIP method created in the first step. The UE may also retrieve other header field contents and SIP message body contents (e.g., SDP) of the SIP method. Third, the UE may create one or more IP-related routing policies (e.g., ISRP and/or IARP rules) using an IMS Transport Policy retrieved in the second step that contains policy rules relating to control plane traffic. Hereinafter, such routing policies will be referred to as "dynamically created routing policies for the control plane". The UE may use AT commands to dynamically create routing policies for the control plane. Fourth, the UE may send the created SIP method to lower layers, which may then transport the SIP method from the UE to the IMS network using an access technology or PDN Connection (as identified by an APN) as indicated by the dynamically created routing policies for the control plane.

Fifth, after SIP session establishment, the UE may decide or need to create more IP-related routing policies (e.g., if there is user plane data to transport between the UE and IMS network, the retrieved IMS Transport Policy from step #2 contains policy rules that apply to user plane traffic). For example, the UE may create policies such as ISRP and/or IARP rules based on information in the IMS Transport Policy and/or on IP-related information negotiated in the SIP signaling that created the SIP session. Such information may include, but is not limited to, ports negotiated in SDP to be used for media, such as RTP, RTCP, MSRP, etc. The UE may create such additional policies to ensure that all user plane data IP flows are uniquely identified for the service and that the IP flows use an allowed and preferred access technology or PDN Connection (as identified by an APN), and do not use prohibited accesses or PDN Connections. Hereinafter, such policies will be referred to as "dynamically created routing policies for the user plane". The UE may use new or enhanced AT commands to dynamically create routing policies for the user plane.

Creating dynamically created routing policies for the user plane after SIP session establishment allows for more accurate IP-related policy in the UE in that one or more transport layer port numbers may be known (e.g., from the SDP) and may be reliably set in the IP layer policy, thus preventing conflicts or overlaps with IP flows for other services.

Optionally, instead of using the ICSI from the IMS Transport Policy that is provisioned to or received at the UE in the first step discussed above, the UE may use header field information and message body contents (e.g., SDP) that are currently provided, e.g., in a 200 OK SIP response message. Alternatively or additionally, the UE may use an ICSI or information derived from an ICSI. Such information may be received from the network or provided in a SIP Response message. The SIP Response message may be, for example, a 200 OK response message that has been enhanced to include an ICSI. Such an ICSI may be the same as or different from the preferred ICSI from the first step. Alternatively, the 200 OK response message may be enhanced to include information derived from the asserted ICSI within the network. In the cases where the UE uses information derived from an ICSI, the indication received from the network may not be referred to as an ICSI but may be any reference that corresponds to a previously provided transport policy.

Sixth, the UE may then send any user plane data to the IMS network using an access technology or PDN Connection (as identified by an APN) as indicated by the IMS Transport Policy and/or the dynamically created routing policies for the user plane.

The steps discussed above are pictorially represented in the flow diagram in FIG. 3. At block 302, a UE receives an IMS Transport Policy. At block 304, the UE waits for an invocation of a new IMS-based service, or a modification of an existing IMS-based service. At block 306, the UE creates a SIP method or SIP request. At block 308, the UE looks up and retrieves an IMS Transport Policy using the preferred ICSI (e.g., ICSI included in a P-Preferred-Service header field). At block 310, the UE determines whether an IMS Transport Policy exists for the control plane for the preferred ICSI. If such an IMS Transport Policy does exist, then the procedure moves to block 312, where the UE dynamically creates one or more routing policies for the control plane. The procedure then moves to block 314, where the UE sends the SIP request/method to lower layers in order to be sent to the network. If, at block 310, it is determined that such an IMS Transport Policy does not exist, then block 312 is bypassed and the procedure moves directly to block 314. After block 314, the procedure moves to block 316, where the UE waits for SIP dialogue confirmation, such as a 200 OK message. Then, at block 318, it is determined whether user plane data is required. If user plane data is not required, the procedure ends. If user plane data is required, the procedure moves to block 320, where it is determined whether IMS Transport Policy exists for the user plane for the preferred ICSI. If such an IMS Transport Policy does exist, the procedure moves to block 322, where the UE dynamically creates one or more routing policies for the user plane. The procedure then moves to block 324, where the UE sends the user plane data to lower layers in order to be sent to the network. The procedure then ends. If, at block 320 it is determined that an IMS Transport Policy for the user plane does not exist, then the procedure moves directly to block 324.

Responsive to UE-initiated or IMS network-initiated disconnection or release of a session for an IMS-based service (e.g., call release or session release) as established in the steps above, the UE may then remove all or a subset of the dynamically created routing policies for the control plane and/or all or a subset of the dynamically created routing policies for the user plane. In some aspects, the UE may also use IMS Transport Policy to determine if the UE is allowed or prohibited to perform a SIP/IMS registration over a particular transport.

Details will now be provided regarding the embodiments described above. Details regarding the structure of an IMS Transport Policy will be described first.

IMS Transport Policy may comprise one or more sets of IMS service transport rules, where a set of IMS service transport rules may comprise at least an indication of one or more IMS-based services and an indication of one or more access transports that are allowed/prohibited and/or preferred over other access transports. Therefore, a set of IMS service transport rules may be defined as containing at least Service Indication Data (SID) and Transport Indication Data (TID). The SID may comprise an indication of one or more IMS-based services. The TID may comprise an indication of one or more transports that can/cannot and/or are preferred to be used to transport or transmit or route (e.g., between a UE and a network) IP flows or data relating to one or more IMS-based services indicated in the SID. The transports may be access technologies and/or PDN Connections. Example access technologies include, but are not necessarily limited to, mobile/cellular (e.g., 2G/GERAN, 3G/UTRAN, 4G/LTE/E-UTRAN, or CDMA2000), Wi-Fi/WLAN (e.g., IEEE 802.11-based technologies), Bluetooth, NFC, WiMAX, wireless chargers, Ethernet, cable modem, DSL, fiber, USB, and wireless USB. The PDN Connections may be identified by, for example, an APN, an NSAPI, etc.

Figure 4:
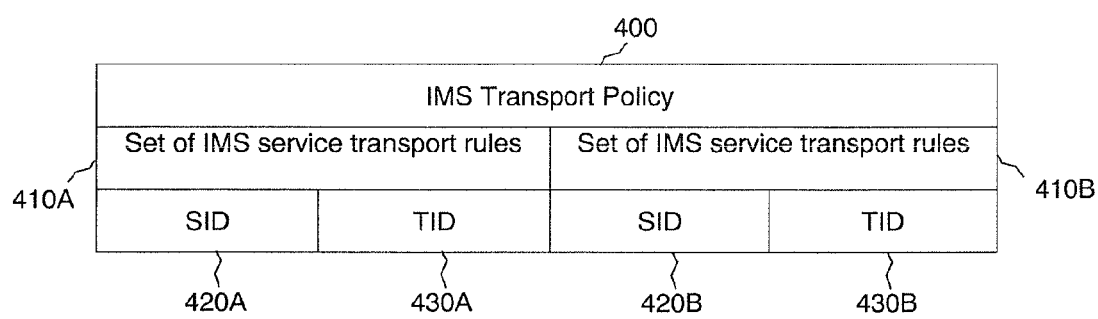
FIG. 4 is a diagram of a basic structure of IMS Transport Policy according to an embodiment of the disclosure.

An example of an IMS Transport Policy structure is illustrated in FIG. 4, which shows an IMS Transport Policy 400 that contains two sets of service transport rules 410A and 410B, each of which in turn contains a SID portion 420A and 420B and a TID portion 430A and 430B, respectively. The IMS Transport Policy 400 may also be referred to herein as an IMS transport policy set. A SID (e.g., 420A, 420B) may also be referred to herein as an indication of at least one IMS service. A TID (e.g., 430A, 430B) may also be referred to herein as an indication of a policy for at least one access technology associated with the at least one IMS service.

In addition to the SID and TID components, or as an alternative to the TID component, an indication may be provided to indicate an allowance or prohibition as to whether one or more IMS-based services indicated in the SID component may be transported or off-loaded to a WLAN from mobile/cellular networks. Such indication may be referred to hereinafter as an "Offload Indication".

If a TID component contains multiple transports, then each transport may be associated with a particular weighting or preference, which may comprise a field that contains a value (e.g., a number where the lower the number is, the higher the preference, or vice versa). In some implementations, such weighting or preference may be derived implicitly such as by a specific ordering of the transports in the TID component. The TID component may also or alternatively contain an indication for some or all transports contained within the TID component, the indication indicating whether the transports can be used by the service identified in the SID when the device is disabled from using cellular PS data (e.g. "Data Off" mode in the UE).

A set of IMS service transport rules may contain additional and/or alternative components. One such component may be an indication of one or more Network Identities (e.g., PLMN code, WLAN identity, or NAI) or country identities (e.g., MCC) to which the set of IMS service transport rules is applicable. Another such component may be an indication of a time period in which the set of IMS service transport rules may or should or can or shall be used. For example, one or more specific dates, months, years, times of day, and/or frequency/occurrence (e.g., daily, weekly, monthly, or yearly) may be indicated. The date and time in the UE or an attached network may be used. Another such component may indicate a weighting or preference of a set of IMS service transport rules relative to other sets of IMS service transport rules within the IMS Transport Policy. The weighting or preference may be indicated via a field that contains a value, or implied via a specific ordering of the set of IMS service transport rules in the IMS Transport Policy. Another such component may be an indication of whether the set of IMS service transport rules applies to one or both of outgoing calls/sessions and incoming calls/sessions. Another such component may be an indication of whether the set of IMS service transport rules applies to a modification of an existing call or session. Such a component may optionally indicate if the set of IMS service transport rules are reapplied when, for example, media is added to an existing call/session, media is deleted from an existing call/session, and/or existing media is modified in an existing call/session (e.g., a change of codec for a voice or video call or a change of content in an IM session).

A SID component may also include additional components, such as, but not limited to, one or more of: a SID Identifier, which may be one or more characters or one or more bytes/octets comprising data representing one or more numbers, letters, or both numbers and letters; one or more ICS's, such as those defined in 3GPP TS 23.228 and 3GPP TS 24.229; one or more IARIs, such as those defined in 3GPP TS 23.228 and 3GPP TS 24.229; one or more feature tags; one or more media feature tags, such as those defined in 3GPP TS 24.229 or IETF RFC 3840; one or more SDP descriptions (also known as an "SDP message body"); one or more components of an SDP description, such as a codec list; one or more SIP Methods or SIP request types; and/or one or more SIP responses.

Alternatively or additionally, the SID or TID may comprise a "Mapping Code" that is defined as one or more characters (e.g., a character string) or one or more bytes/octets that comprise data representing one or more numbers (e.g., numeric code), letters (e.g., alphabetic code), or both numbers and letters (e.g., alphanumeric code). The Mapping Code, when used in a SID, may have a defined mapping to one or more SID components and, when used in a TID, may have a defined mapping to one or more TID components. For example, the Mapping Code may be or contain a SID Identifier or TID Identifier.

Populating the SID with a Mapping Code instead of an indication of one or more IMS-based services and populating the TID with a Mapping Code instead of an indication of one more transports may provide efficiencies regarding the length of an information element (IE), or parameter, attribute, Attribute Value Pair, variable, container, header field, etc. That is, a message that contains a SID with a Mapping Code component may be made shorter than if the SID contained an ICSI, IARI, SDP description, components of an SDP description, and/or SIP Methods. Likewise, a message that contains a TID with a Mapping Code component may be made shorter than if the TID contained a list of one or more transports. Use of a Mapping Code may also allow an entity external to a UE to more easily update previously stored IMS Transport Policy on the UE.

Information regarding whether the SID of a set of IMS service transport rules contains a Mapping Code or an indication of one or more IMS-based services and whether the TID of a set of IMS service transport rules contains a Mapping Code or an indication of one more transports may be pre-configured. Alternatively, such information may be determined (e.g., by a UE) by analyzing a portion of the SID or TID. For example, a predefined component, portion, element, character, field, information element, or sub-field may be analyzed for a particular value e.g., a first character or digit, a last character or digit, etc. Alternatively, such information may be determined (e.g., by a UE) by analyzing all of the SID or TID. For example, the length of the SID or TID may be analyzed, or the contents of the SID or TID may be analyzed to match against a known value, pattern, or format associated with a Mapping Code.

If it is determined that a SID of a set of IMS service transport rules contains a Mapping Code, the Mapping Code may be translated (e.g., by a UE) to an indication of one or more IMS-based services (e.g., by using a look-up table, a hash table, a hash function, or a look-up to a server). The translating device may also store the association of the Mapping Code and the indication of one or more IMS-based services. Alternatively, the device may store the mapped-to indication of one or more IMS-based services in place of the Mapping Code in the SID component that originally contained the Mapping Code.

If it is determined that a TID of a set of IMS service transport rules contains a Mapping Code, the Mapping Code may be translated (e.g., by a UE) to an indication of one or more transports (e.g., by using a look-up table, a hash table, a hash function, or a look-up to a server). The translating device may also store the association of the Mapping Code and the indication of one or more transports. Alternatively, the device may store the mapped-to indication of one or more transports in place of the Mapping Code in the TID component that originally contained the Mapping Code.

As an alternative implementation, the Mapping Code may identify a set of IMS service transport rules whereby the same functionality as described above would be applicable. However, in this instance, the Mapping Code may identify more data, such as a SID and a TID; a SID and an Offload Indication; a SID, a TID, and an Offload Indication; etc.

Figure 5:
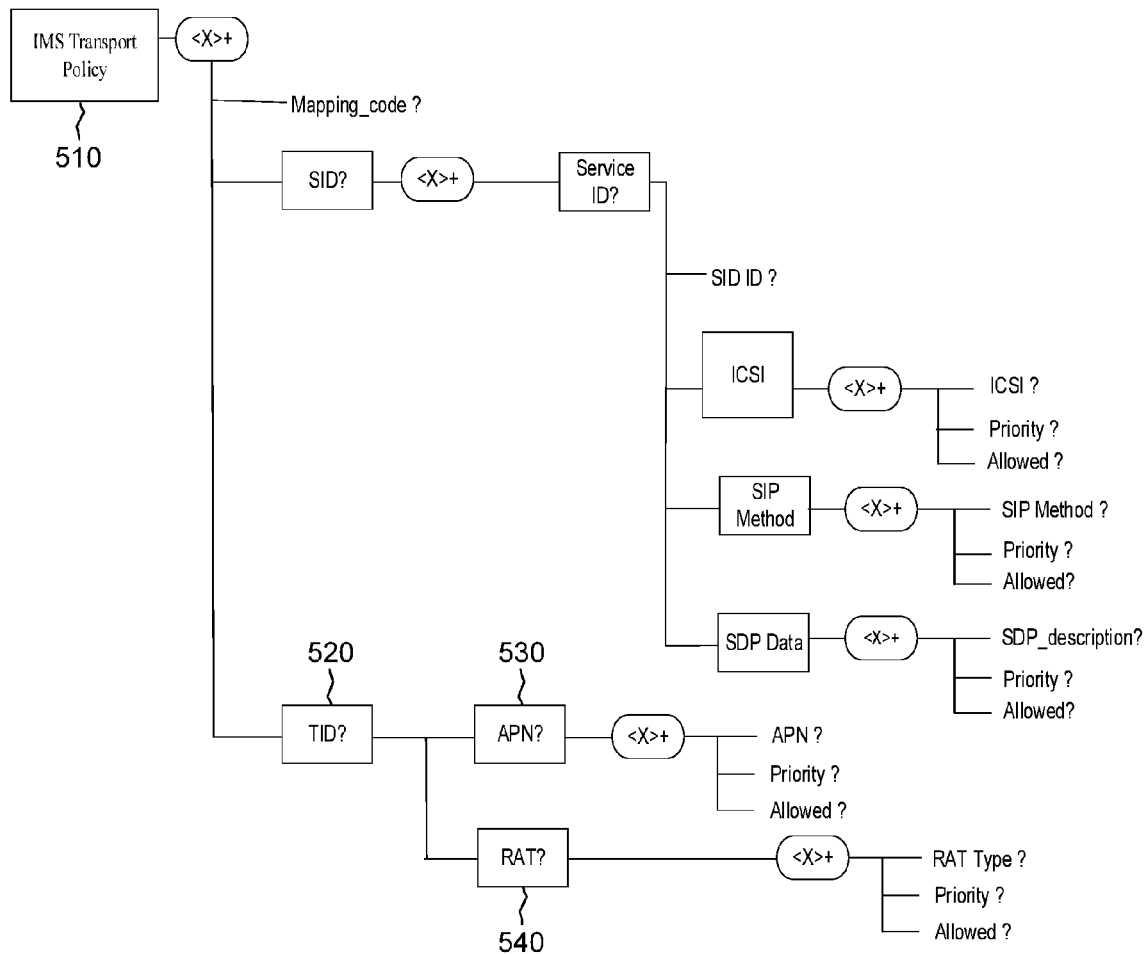
FIG. 5 is a diagrammatic representation of IMS Transport Policy according to an embodiment of the disclosure.

FIG. 5 shows a diagrammatic view of the manner in which an IMS Transport Policy 510 may be stored in a UE according to an embodiment. In this representation, the TID component 520 has been split out into two components denoted as "APN?" 530 and "RAT?" 540 in FIG. 5. An alternative representation of the manner in which an IMS Transport Policy 610 may be stored in a UE is shown in FIG. 6.

Figure 6:
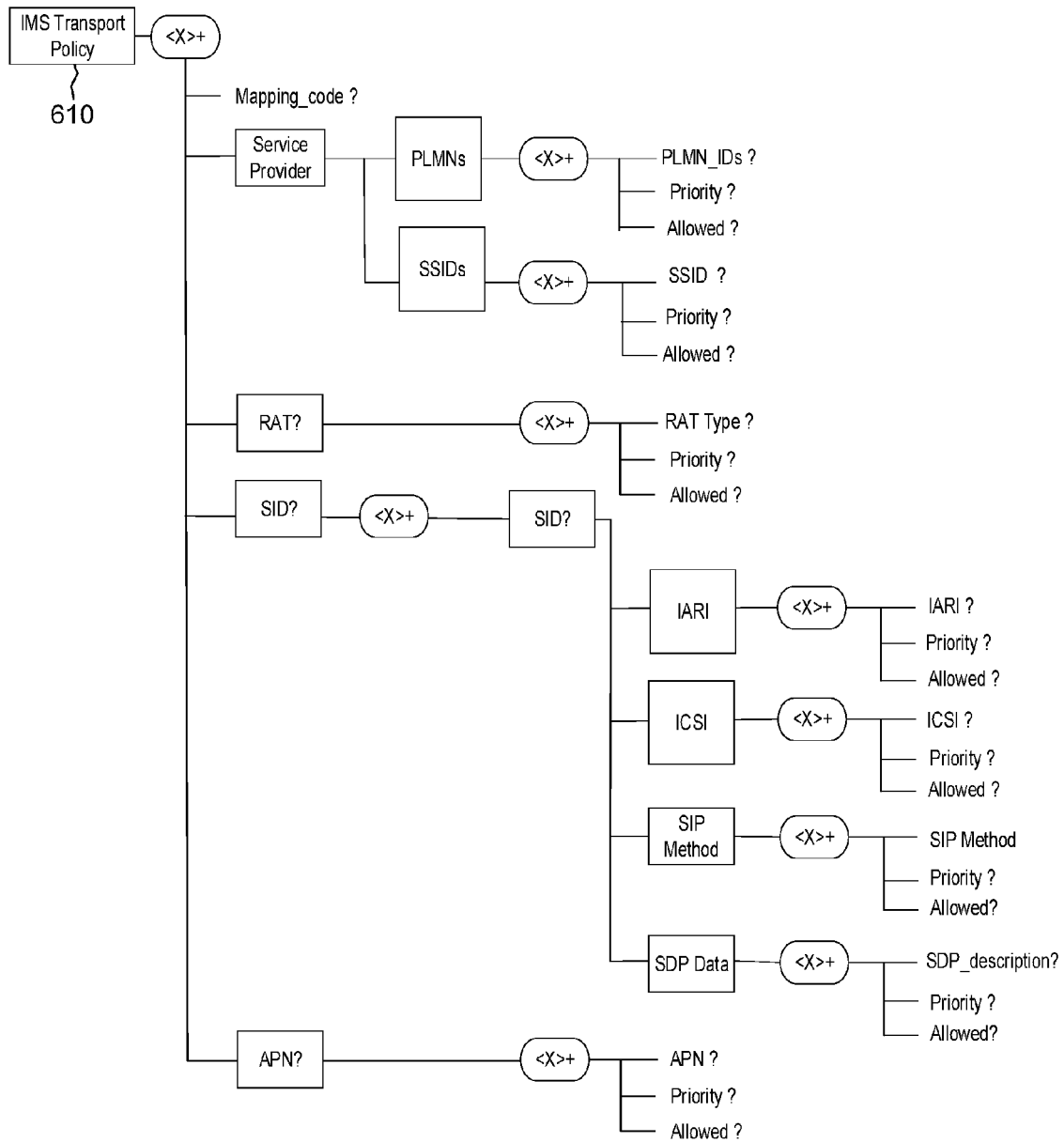
FIG. 6 is an alternative diagrammatic representation of IMS Transport Policy according to an embodiment of the disclosure.

One skilled in the art will appreciate what each of the boxes in FIG. 5 and FIG. 6 may represent. For example, a box containing a "?" indicates that the data item is optional, and a box containing an <x+> indicates that the data is selected from a list of entries ranging from 0 to 1 or more entries. Furthermore, the IMS Transport Policy data structure tree may be a subcomponent of any data structure trees or new trees that are defined in 3GPP management objects.

Details regarding the provisioning of a UE with IMS Transport Policy (e.g., as in block 302 in FIG. 2) will now be provided.

In a first approach, a UE retrieves IMS Transport Policy from a file on a UICC. This approach may be referred to as Provisioning Method A. In a second approach, a UE retrieves IMS Transport Policy from an entity external to the UE, such as a server. This approach may be referred to as Provisioning Method B.

Under Provisioning Method A, a UICC (which may be an embedded UICC (eUICC)) within or associated with a UE is provisioned with IMS Transport Policy by the UICC owner (e.g., a carrier or an operator). The provisioning of the UICC may be performed during the manufacturing process of the UICC, using a UICC remote provisioning mechanism (e.g., SIM OTA, Remote Provisioning of eUICC profiles), or by some other means. A mobile entity (ME) may retrieve the UICC-provisioned IMS Transport Policy from the UICC at any time, such as upon UE wake-up/switch-on/power-up, upon insertion of an insertable/removable UICC, or upon activation of a new SIM/USIM application on a UICC or eUICC.

FIG. 7 depicts one possible embodiment of how data may be encoded on the UICC (e.g., using a USIM as defined in 3GPP TS 31.102 or using an ISIM as defined in 3GPP TS 31.103). However, it is to be understood that data could also be encoded using any of the mechanisms described herein.

Under Provisioning Method B, a UE is able to retrieve IMS Transport Policy remotely from an entity external to the UE in the network. Such an entity may be referred to hereinafter as a "network node" or a "network element". (FIG. 9, which will be discussed in more detail below, provides examples of what such a network node may be). For example, the UE may send the network node a request message providing a variety of information that may be used by the network node to tailor the IMS Transport Policy. Such information may be referred to hereinafter as "Additional UE Provided Information". The IMS Transport Policy may then be returned to the UE in a response message to the request message.

The request message sent to the network node by the UE to request IMS Transport Policy may be, for example, a message before the UE registers with the network (e.g., an ANQP request), a registration-type message (e.g., Attach or TAU/RAU), a data session establishment message (e.g., a PDN Connection, PDP Context activation, setup, modification, or request), a dedicated message for retrieving IMS Transport Policy, etc.

The protocols utilized by the request message and/or response message may include one or more of Non-Access Stratum signaling (e.g., as defined in 3GPP TS 24.008 and 3GPP TS 24.301), RADIUS, Diameter, LDAP, SQL, DNS, DHCP, GTP, SOAP, XML, HTTP, SIP, SDP, OMA DM, SIM OTA, or SIM Toolkit.

The IMS Transport Policy may be stored in the network node that received the request message from the UE (referred to hereinafter as the "first network node"), or the IMS Transport Policy may be obtained from another network node (referred to hereinafter as the "second network node"). The second network node may be connected directly to the first network node, or may be connected indirectly via one or more other intermediate network nodes (e.g., servers or proxies). Upon receiving a request for data, the second network node may return the data to the first network node either directly or indirectly via one or more other intermediate network nodes.

Figure 8:
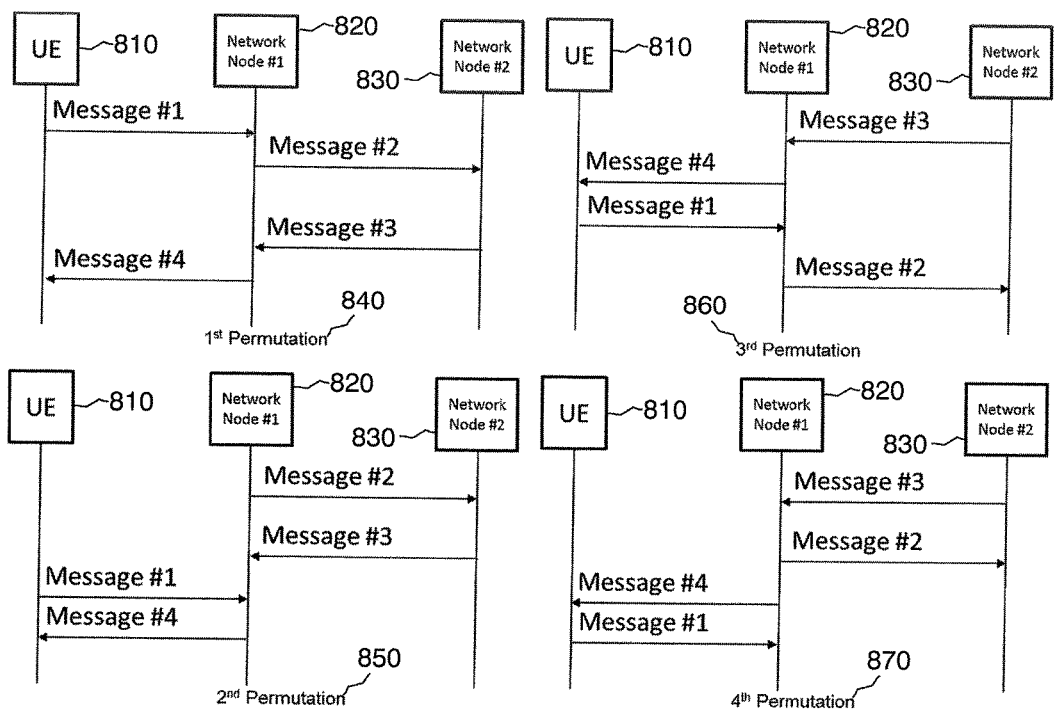
FIG. 8 illustrates general message flow permutations according to embodiments of the disclosure.

FIG. 8 illustrates the messaging between a UE 810, a first network node (denoted as "Network Node #1" 820), and a second network node (denoted as "Network Node #2" 830). The message flow sequences in FIG. 8 are illustrative only, as other orderings of the messages are possible.

In a first permutation 840, the UE 810 sends Message #1 to Network Node #1 820. Message #1 may contain Additional UE Provided Information. Upon receiving Message #1, Network Node #1 820 may send an optional message such as Message #2 to Network Node #2 830. Message #2 may contain Additional UE Provided Information, such as if received in Message #1. Upon receiving Message #2, Network Node #2 830 sends Message #3 to Network Node #1 820. Message #3 may contain IMS Transport Policy, an error message, or both. Upon receiving Message #3, Network Node #1 820 sends Message #4 to the UE 810. Alternatively, since Message #2 is optional, Network Node #1 820 may send Message #4 in response to receiving Message #1. Message #4 may contain IMS Transport Policy, an error message, or both, e.g., depending on what information was received in Message #3.

In a second permutation 850, Network Node #1 820 sends Message #2 to Network Node #2 830. Message #2 may contain Additional UE Provided Information, e.g., if previously received from the UE 810. Upon receiving Message #2, Network Node #2 830 sends Message #3 to Network Node #1 820. Message #3 may contain IMS Transport Policy, an error message, or both. The UE 810 sends Message #1 to Network Node #1 820. Message #1 may contain Additional UE Provided Information. Upon receiving Message #1, Network Node #1 820 sends Message #4 to the UE 810. Message #4 may contain IMS Transport Policy, an error message, or both, e.g., depending on what information was received in Message #3.

In a third permutation 860, Network Node #2 830 sends Message #3 to Network Node #1 820. Message #3 contains IMS Transport Policy. Upon receiving Message #3, Network Node #1 820 sends Message #4 to the UE 810. Message #4 contains IMS Transport Policy (e.g., as received in Message #3). Upon receiving Message #4, the UE 810 sends Message #1 to Network Node #1 820. Message #1 may contain Additional UE Provided Information. Upon receiving Message #1, Network Node #1 820 may send Message #2 to Network Node #2 830. Message #2 may contain Additional UE Provided Information (e.g., if received in Message #1).

In a fourth permutation 870, Network Node #2 830 sends Message #3 to Network Node #1 820. Message #3 contains IMS Transport Policy. Upon receiving Message #3, Network Node #1 820 may send Message #2 to Network Node #2 830. Message #2 may contain Additional UE Provided Information (e.g., if previously received from the UE 810). Upon receiving Message #3, Network Node #1 820 sends Message #4 to the UE 810. Alternatively, Network Node #1 820 may not necessarily send Message #4 to the UE 810 in response to receiving Message #3, but may instead send Message #4 based on some other event, such as a Tracking Area Update procedure performed by the UE 810. Message #4 contains IMS Transport Policy (e.g., as received in Message #3). Upon receiving Message #4, the UE 810 sends Message #1 to Network Node #1 820, and Message #1 may contain Additional UE Provided Information.

The first permutation and second permutation may be used in a "fetch" or "get" or "pull" type architecture. The third permutation and fourth permutation may be used in a "put" or "post" or "push" type architecture.

Examples of what Network Node #1 and Network Node #2 may be are provided in FIG. 9. Examples of what Messages #1-4 may be are provided in FIG. 10.

An example of "Additional UE Provided Information" discussed herein may include, but is not limited to, the following: an indication that IMS Transport Policy is requested by the UE; an indication as to what transport or transports for which the UE requires IMS Transport Policy; an indication as to what transport or transports the UE supports; an indication as to what transport or transports to which the UE currently has access or are active in the UE and/or are connected; an indication as to what transport or transports to which the UE currently has no access or are inactive in the UE and/or are disconnected; an indication of the UE's capabilities (e.g., IFOM, MAPCON, OPIIS, etc.); an indication of the transport or transports for which the UE has a configuration; and/or an indication of Network Identities such as those to which the UE has access, those with which the UE is registered, and/or those for which the UE has a configuration.

AAA messages using EAP may be used to obtain the transport policy. The existing IETF document "draft-mc-cann-session-policy-framework-using-eap" describes the use of AAA messages to obtain a session policy. Similar messages may be used in this and/or other embodiments.

The use of SIP signaling (e.g., SUBSCRIBE/NOTIFY) may be employed as an alternative solution based on either a new policy event package for the transport policy or an extension to the registration event package (see 3GPP TS 24.229) or to the session policy event package (see IETF RFC 6795).

Figure 11:
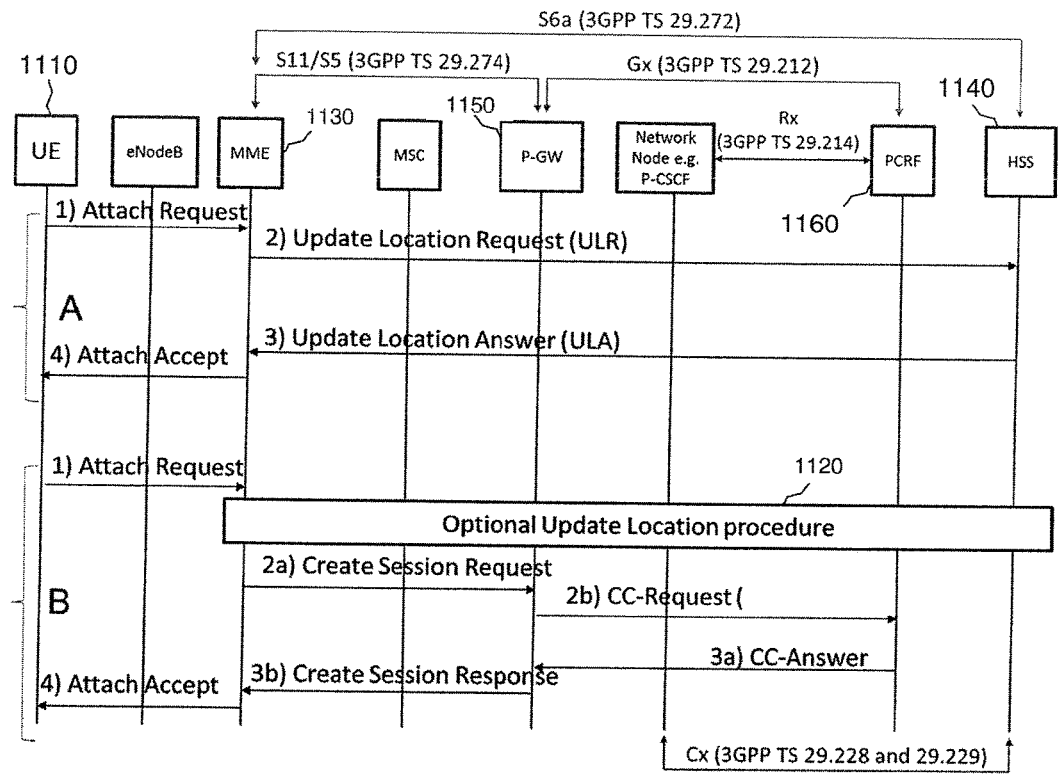
FIG. 11 illustrates possible LTE implementations of provisioning IMS Transport Policy to a UE according to an embodiment of the disclosure.

Two example implementations of provisioning IMS Transport Policy to a UE are shown in FIG. 11 and are labelled "A" and "B". In these examples, the UE 1110 is provisioned with IMS Transport Policy based on an LTE/E-UTRAN Attach procedure. The numbers assigned to the messages in FIG. 11 have a direct correlation to the message numbers denoted in FIG. 8.

The box 1120 labelled "Optional Update Location procedure" denotes that an Update Location Procedure or Tracking Area Update Procedure or Routing Area Update Procedure or Location Area Update procedure may, but need not, take place before the messages denoted 1, 2a, 2b, 3a and 3b. For example, the UE may have already registered to the MME 1130 and may be attaching again. If such a procedure is performed, then 2 and 3 in implementation "A" would occur before 2a, 2b, 3a and 3b.

In the implementation labelled "A", the UE attaches to the network, optionally sends Additional UE Provided Information in the Attach message, and then receives IMS Transport Policy in the Attach Accept message. The IMS Transport Policy may be stored in the HSS 1140 and may be downloaded or transferred to the MME 1130.

The implementation labelled "B" is the same as implementation "A" except that the IMS Transport Policy is sent from the P-GW 1150 to the MME 1130. The P-GW 1150 may have obtained the IMS Transport Policy from the PCRF 1160.

Figure 12:
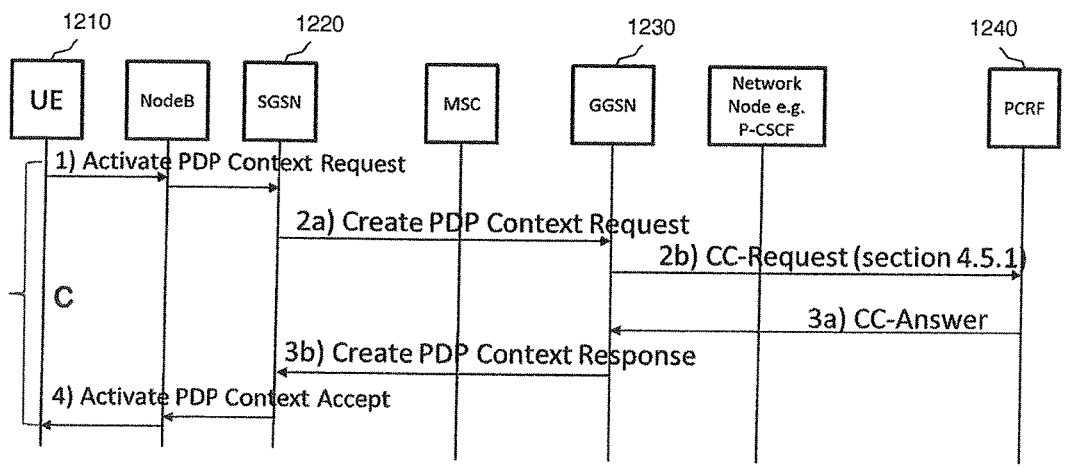
FIG. 12 illustrates a possible implementation of provisioning IMS Transport Policy to a UE for GPRS according to an embodiment of the disclosure.

An additional example implementation of IMS Transport Policy being provisioned to a UE is shown in FIG. 12 and is labelled "C". In this example, the UE 1210 is provisioned with IMS Transport Policy during a PDP Context Activation procedure. The numbers assigned to the messages in FIG. 12 have a direct correlation to the message numbers denoted in FIG. 8.

In Implementation C, the UE 1210 optionally sends Additional UE Provided Information in the Activate PDP Context Request message and then receives IMS Transport Policy in the Activate PDP Context Response message. The IMS Transport Policy may be stored in the SGSN 1220 after being downloaded from the GGSN 1230. The GGSN 1230 may download the IMS Transport Policy from the PCRF 1240. Other functional entities may also be involved, e.g., HLR/HSS.

Implementations A, B and C may also be used to update IMS Transport Policy that was previously downloaded (by, e.g., Implementation A, Implementation B, Implementation C, or another mechanism) in addition or as an alternative to downloading new IMS Transport Policy. Such updating allows for a more optimized method of delivering the information, whereby the information can be tailored to the actual PDP Context or PDN Connection being used. In this case, one or more Mapping Codes may be used in downloaded IMS Transport Policy.

One skilled in the art will appreciate that while Implementations A, B and C are specific examples, the messages may be different, e.g., messages according to Messages #1, #2, #3 and/or #4 in FIG. 10 may be used in some implementations.

Details regarding the use of IMS Transport Policy by a UE will now be provided.

Once IMS Transport Policy has been received by the UE (e.g., using one of the methods described herein), the IMS Transport Policy may be stored by the UE in such a way that the IMS Transport Policy can be retrieved or referenced. That is, the IMS Transport Policy may be temporarily or permanently stored in the device or in storage associated with the device, such as internal memory or storage (e.g., RAM or Flash RAM). Alternatively, storage may occur in an external data card, such as in a file or application stored on a UICC/SIM card or R-UIM (e.g., SIM, USIM, or ISIM) or such as in a file stored on a removable memory card (e.g., a MicroSD memory card). Two example embodiments of storage comprise an ANDSF data structure and a UICC file, as described herein.

In some implementations, the UE may delete all or a subset of IMS Transport Policy when one or more of the following event occurs: the UE is powered off or loses power; the UICC/SIM card or R-UIM is removed from or replaced in the UE; new IMS Transport Policy is received; the UE detaches from a network, such as a cellular network (PLMN) or a WLAN; the UE or the network deactivates, tears down, or deletes a data connection, such as PDP Context, EPS/PDN Connection, EPS Bearer, or TCP association; and/or the UE or the network deregisters the UE from IMS.

At any time, a user, process or service may initiate the UE to perform a SIP/IMS registration over a particular transport. Upon initiation of the registration, but before the registration operation is commenced (e.g., before a SIP REGISTER is sent by the UE to the network), the UE may check for the particular transport in the UE's stored IMS Transport Policy.

If the UE's stored IMS Transport Policy does not contain the particular transport (i.e., if there are no sets of IMS service transport rules that contain the particular transport), then the UE may be allowed to perform the SIP/IMS registration (e.g., to permit backwards compatibility). Alternatively, the UE may be prohibited from performing the SIP/IMS registration, e.g., based on other policies, configurations, or settings available to the UE, which should indicate that the network supports the use of a transport policy solution.

If the UE's stored IMS Transport Policy does contain the particular transport (i.e., if one or more sets of IMS service transport rules have a matching transport in their TID component), then the IMS-based services indicated in the IMS service transport rules that contain the particular transport in their TID component may be indicated in the SIP/IMS registration. For example, a SIP REGISTER that contains one or more of an ICSI, IARI, feature tag, or media feature tag may be sent by the UE to the network.

If SIP is used to obtain the transport policy, then the UE may need to complete SIP registration. However, the UE may subsequently need to re-register after having obtained the policy, specifically if the UE is required to use a different access network (in accordance with the policy).

As an optional enhancement, the UE may not perform the SIP/IMS registration if the stored IMS Transport Policy does not contain the particular transport for any IMS-based service and/or if the IMS Transport Policy prohibits the particular transport for all IMS-based services. In such a case, the UE may indicate to the user and/or to upper protocol layers in the UE that SIP/IMS registration is denied or prohibited.

At any time after at least one successful SIP/IMS registration has occurred, a user or process or service may initiate the UE to perform one or more actions. For example, the UE may be initiated to establish a new call/session for a particular IMS-based service, such as initiation of a voice/VoLTE call or initiation of a video/ViLTE call. Alternatively or additionally, the UE may be initiated to modify an existing call/session for a particular IMS-based service, such as modifying an existing voice/VoLTE call to change or upgrade to a video/ViLTE call or modifying an existing voice/VoLTE call to use a different codec or different codec settings. Alternatively or additionally, the UE may be initiated to send a message for a particular IMS-based service, such as sending an SMS message or sending an Instant Message.

After the initiation but before the establishment of the new call/session, the modification of the existing call/session, or the sending of the message, the UE may determine whether an IMS-based service associated with the new call/session, modified call/session, or message to be sent is mentioned in the UE's stored IMS Transport Policy. The UE may also check what transports are available to the UE to transport IMS control plane IP flows/data. The check of the IMS Transport Policy and the check of available transports may be performed in any order. The UE may also perform similar checks but for IMS user plane IP flows.

A transport is considered to be available to the UE to transport IMS control plane IP flows or IMS user plane IP flows if the transport has previously been used to perform an IMS/SIP registration (e.g., as specified in 3GPP TS 24.229 and IETF RFC 3261). In such a case, the IMS has a binding of the UE to that transport, such as the UE's IP address, for an interface for the transport with SIP/IMS credentials (e.g., Private User Identity or Public User Identities or Reg-Id or InstanceId or GRUU). This consideration includes transports that can be offloaded, transferred, or handed over between access technologies without the UE needing to use a different IP address. For example, a PDN Connection to a particular APN (e.g., an IMS well-known APN) over one access technology (e.g., E-UTRAN) may have been used by the UE to perform an IMS/SIP registration, and the PDN Connection to the particular APN may then have been offloaded or handed-over some time later to a different access technology (e.g., Wi-Fi or WLAN).

A transport may also or alternatively be considered to be unavailable if the UE has been disabled from using PS cellular data (e.g., "Data Off" mode is enabled on the UE);

or the transport may be considered available and a component of the TID(s) of the selected set of IMS service transport rules (as defined below) may be used to determine if the transport may be used by the service(s) identified in the SID(s) of the selected set of IMS service transport rules while the UE has been disabled from using PS cellular data.

If no transports are available to the UE to transport IMS control plane IP flows and/or IMS user plane IP flows, and the UE has determined that the network supports the provision of a transport policy, then at least two conditions may apply. First, if a new call/session was to be established, then the new call/session fails or is prohibited from being established. Second, if a message was to be sent, then the message fails or is prohibited from being sent. In both of these cases, the Comparison Procedure, as described below, may be omitted by the UE.

In the case of initiating a modification to an existing call/session, it may be assumed that at least one transport is available to transport IMS control plane IP flows. That is, the transport currently being used to transport the IMS control plane IP flows for the existing call/session may be available. It may also be assumed that there is at least one transport available to transport any IMS user plane IP flows. That is, the transport currently being used to transport the IMS user plane IP flows for the existing call/session may be available.

The UE may select a set of IMS service transport rules from the stored IMS Transport Policy by attempting to match one or more elements of the SID (e.g., an ICSI) of all sets of IMS service transport rules in the IMS Transport Policy with the details of the particular IMS-based service for initiation of a new call/session, modification of an existing call/session, or transmission of a message. The details of the particular IMS-based service for the initiated new call/session, modified existing call/session, or transmitted message may be included in the contents or elements of the body (e.g., SDP) and/or header fields (e.g., a preferred ICSI such as in a Contact header field) of the SIP method that is to be sent by the UE for the new call/session that is initiated, the existing call/session that is modified, or the message that is transmitted.

If one set of IMS service transport rules from the stored IMS Transport Policy is matched to details of the particular IMS-based service for the new call/session initiation, the existing call/session modification, or the message transmissions, that set of IMS service transport rules is considered the selected set of IMS service transport rules. If two or more sets of IMS service transport rules from the stored IMS Transport Policy are matched to details of the particular IMS-based service for the initiated new call/session, the modified existing call/session, or the transmitted message, then one set of IMS service transport rules is selected. That is, one of the sets is considered the selected set of IMS service transport rules in such case. The selection of the set of IMS service transport rules may be based on one or more of a Network Identity associated with the particular transport, the date or day, the time, and/or a priority or order indicated in the matched sets of IMS service transport rules.

If no sets of IMS service transport rules from the stored IMS Transport Policy are matched to details of the particular IMS-based service for the initiation of a new call/session, modification of an existing call/session, or transmission of a message, then the UE may select a set of IMS service transport rules based on some other criteria, such as a "default" set of IMS service transport rules.

If at least one set of IMS service transport rules is selected and at least one transport is available to the UE to transport IMS control plane IP flows, and (optionally) if the UE has determined that the network supports the provision of a transport policy, then several conditions may apply. First, no transport may be allowed to transport IMS user plane IP flows. That is, all transports available to the UE may be prohibited according to the selected IMS service transport rules. In such cases, the IMS-based service to be initiated by the UE may be either known or not known by the UE to require user plane IP flows (e.g., voice call or video call).

If such information is known by the UE (e.g., by analysis of the SID), then the UE may prohibit the initiation of the IMS-based service. That is, the UE does not send the SIP method for the IMS-based service to the network. If such information is unknown by the UE, then the UE may prohibit the initiation of the IMS-based service or may allow the initiation of the IMS-based service. That is, the UE may, but need not, send the SIP method for the IMS-based service to the network.

Alternatively, if at least one transport that is available to the UE is allowed (according to the selected IMS service transport rules) to transport IMS user plane IP flows, then the UE may allow the initiation of the IMS-based service. That is, the UE may send the SIP method for the IMS-based service to the network.

If the transport policy is obtained using SIP signaling, then the UE may be permitted to initiate the SIP registration and subscription to the policy mechanism to attempt to obtain the transport policy.

For all cases where the IMS-based service to be initiated or modified is allowed, then the UE may execute the procedure depicted in FIG. 3 and described in the accompanying description.

When the UE creates one or both of dynamically created routing policies for the control plane and dynamically created routing policies for the user plane, higher layers of the UE may inform lower layers of the UE to create the routing policies (e.g. ISRP, IARP, etc.) by using new AT commands or enhanced existing AT commands.

If a new call/session fails or is prohibited from being established, or if an existing call/session is prohibited from being modified, or if a message is prohibited from being sent due to IMS Transport Policy prohibiting the use of any available transport, then the UE may provide an indication to the user of the UE informing the user of the failure or prohibition. For example, the UE may display a message on a screen associated with the UE, may provide audible feedback using a speaker associated with the UE, may vibrate, and/or may cause an LED or lamp associated with the UE to switch on, switch off, change color, blink, blink with a certain color, or blink at a certain rate.

As an alternative to the initiation or modification of an existing call/session for a particular IMS-based service, other reasons or triggers may cause the UE to apply IMS Transport Policy to ongoing calls/sessions. For example, a timer in the device may expire or a certain time and/or a certain date may occur. Alternatively, UE may receive an indication by the user via an input mechanism associated with the device, such as a physical or virtual keyboard; a physical or virtual keypad; a physical button on the device; a voice, sound, or microphone input; and/or one or more sensors associated with the device that can detect movement and/or the direction of the device. Alternatively, using indications received as part of the RAN Rules framework, the UE may receive an indication from the HPLMN or VPLMN to commence steering or off-loading of data or traffic. That is, the UE may receive a trigger to off-load or steer data/traffic by one or more indications in an information element (IE) received by the UE from an attached network in a radio broadcast channel (e.g., a SIB information element) and/or an IE in a received dedicated message (e.g., an RRCConnectionReconfiguration message or an ACTIVE SET UPDATE message).

In the case of a UE receiving an indication from the HPLMN or VPLMN, example standards text for 3GPP TS 36.300 is shown in FIG. 13. Alternative example standards text for 3GPP TS 36.300 in such a case is shown in FIG. 14. Other information elements and/or other messages may be used by the UE to receive the indication from the HPLMN or VPLMN to commence steering or off-loading of data or traffic.

Figure 15:
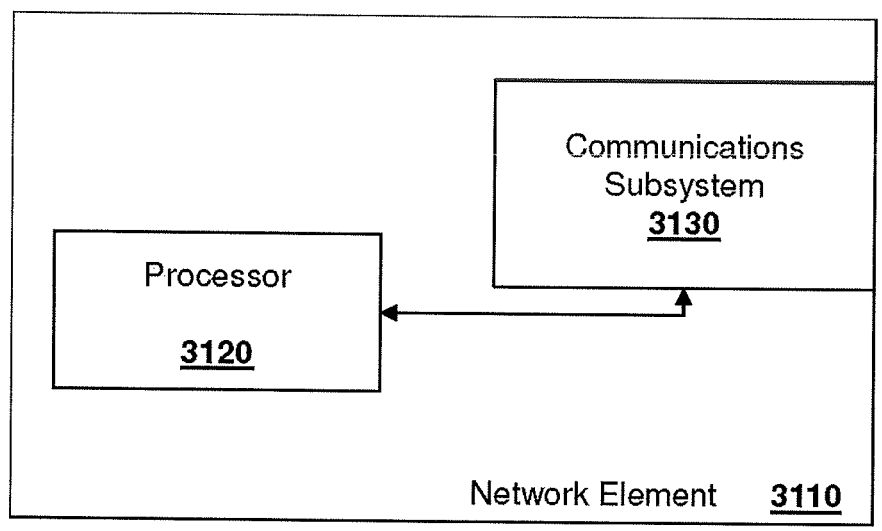
FIG. 15 is a simplified block diagram of an exemplary network element according to one embodiment.

The above may be implemented by a network element. A simplified network element is shown with regard to FIG. 15. In FIG. 15, network element 3110 includes a processor 3120 and a communications subsystem 3130, where the processor 3120 and communications subsystem 3130 cooperate to perform the methods described above.

Figure 16:
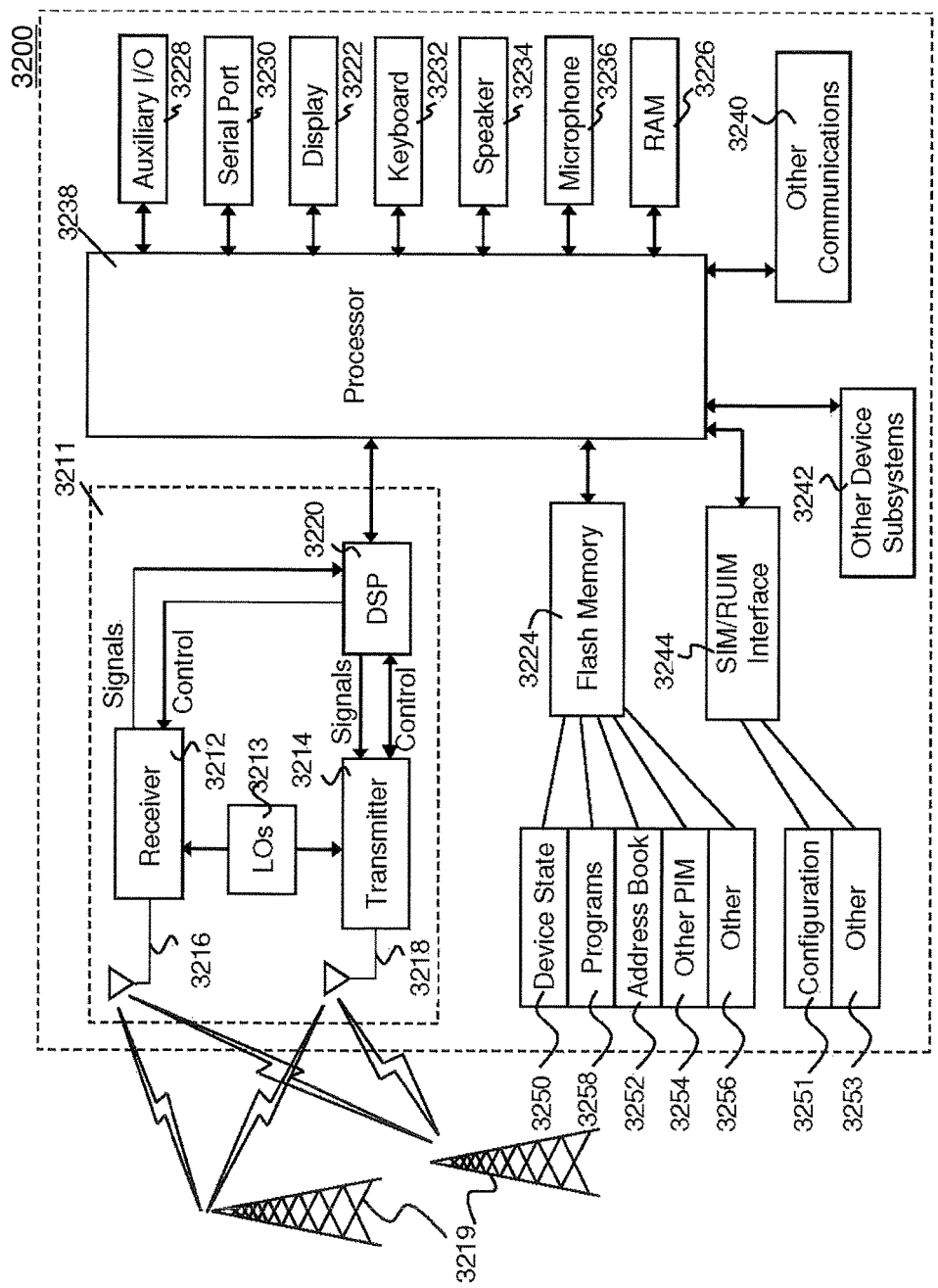
FIG. 16 is a block diagram with an example user equipment capable of being used with the systems and methods in the embodiments described herein.

Further, the above may be implemented by a UE. An example of a UE is described below with regard to FIG. 16. UE 3200 may comprise a two-way wireless communication device having voice and data communication capabilities. In some embodiments, voice communication capabilities are optional. The UE 3200 generally has the capability to communicate with other computer systems on the Internet. Depending on the exact functionality provided, the UE 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network in which the UE 3200 is intended to operate.

Network access requirements may also vary depending upon the type of network 3219. In some networks, network access is associated with a subscriber or user of the UE 3200. The UE 3200 may require a removable user identity module (RUIM) or a subscriber identity module (SIM) card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When required network registration or activation procedures have been completed, the UE 3200 may send and receive communication signals over the network 3219. As illustrated, the network 3219 may comprise multiple base stations communicating with the UE 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem, and any other device subsystems generally designated as 3242. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be segregated into different areas for both computer programs 3258 and program data storage 3250, 3252, 3254 and 3256. These different storage types indicate that each program may allocate a portion of flash memory 3224 for their own data storage requirements. Processor 3238, in addition to its operating system functions, may enable execution of software applications on the UE 3200. A predetermined set of applications that control basic operations, including at least data and voice communication applications for example, may typically be installed on the UE 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the UE 3200 such as, but not limited to, e-mail, calendar events, voice mails, appointments, and task items. One or more memory stores may be available on the UE 3200 to facilitate storage of PIM data items. Such a PIM application may have the ability to send and receive data items via the wireless network 3219. Further applications may also be loaded onto the UE 3200 through the network 3219, an auxiliary I/O subsystem 3228, serial port 3230, short-range communications subsystem 3240, or any other suitable subsystem 3242, and installed by a user in the RAM 3226 or a non-volatile store (not shown) for execution by the processor 3238. Such flexibility in application installation may increase the functionality of the UE 3200 and may provide enhanced on-device functions, communication-related functions, or both. For example, secure communication applications may enable electronic commerce functions and other such financial transactions to be performed using the UE 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of the UE 3200 may also compose data items, such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of the UE 3200 is similar, except that received signals may typically be output to a speaker 3234 and signals for transmission may be generated by a microphone 3236. Alternative voice or audio I/O subsystems, such as a voice message recording subsystem, may also be implemented on the UE 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the UE 3200 by providing for information or software downloads to the UE 3200 other than through a wireless communication network. The alternate download path may, for example, be used to load an encryption key onto the UE 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi, WiMAX, near field communication (NFC), and/or radio frequency identification (RFID). The other communications element 3240 may also be used to communicate with auxiliary devices such as tablet displays, keyboards or projectors.

Figure 17:
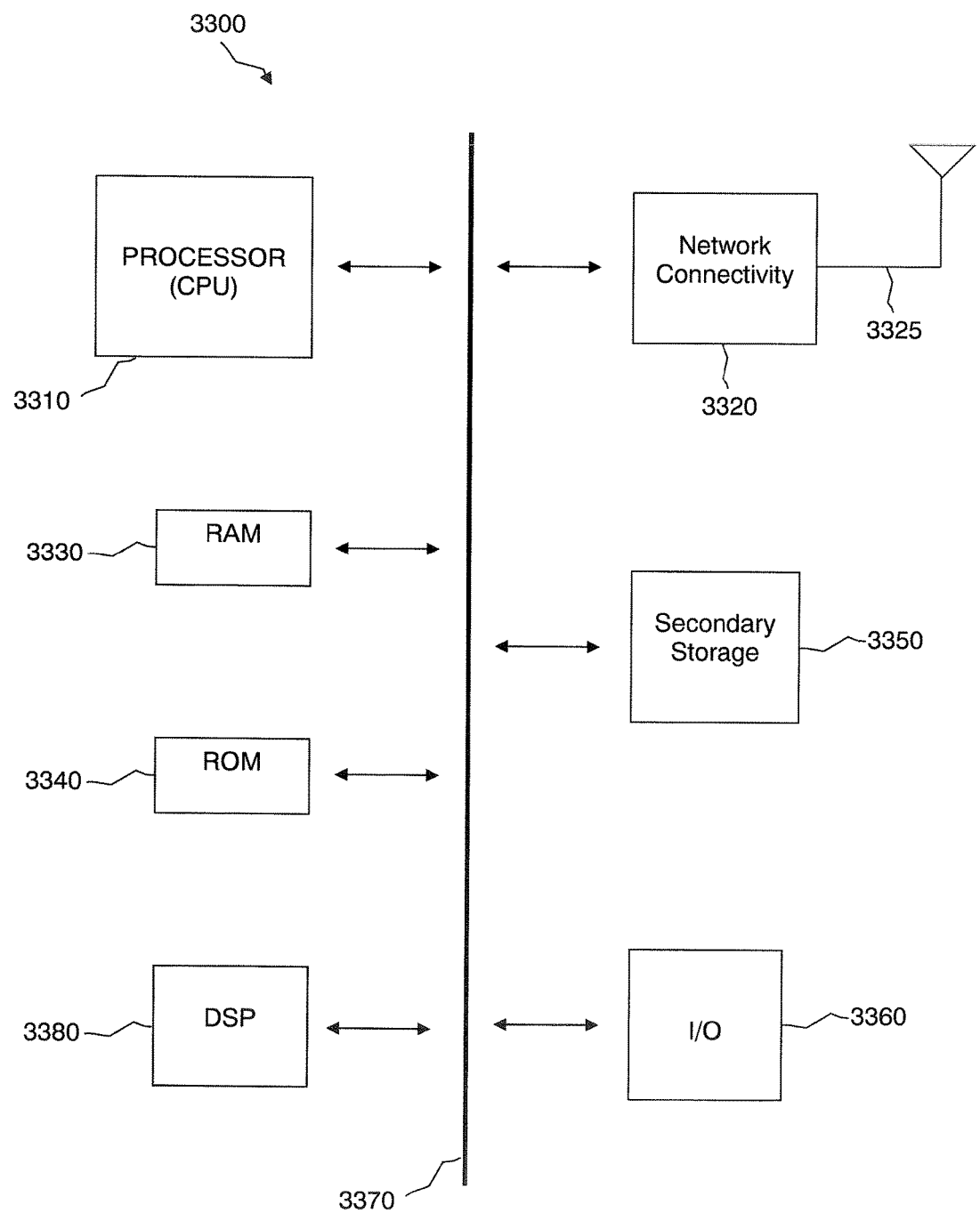
FIG. 17 illustrates a processor and related components suitable for implementing the several embodiments of the present disclosure.

The UE and other components described above might include a processing component that is capable of executing instructions related to the actions described above. FIG. 17 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The following are incorporated herein by reference for all purposes: 3GPP TS 27.007, 3GPP TS 22.278, 3GPP TS 23.402, 3GPP TS 24.312, 3GPP TS 36.300, 3GPP TS 36.304, 3GPP TS 36.331, 3GPP TS 24.237, 3GPP TS 24.216, 3GPP TS 24.229, 3GPP TS 23.401, 3GPP TS 24.604, 3GPP TS 24.167, 3GPP TS 23.228, 3GPP TS 24.341, 3GPP TS 31.102, 3GPP TS 31.103, 3GPP TS 24.008, 3GPP TS 24.301, 3GPP TS 23.203, 3GPP TS 23.060, IETF RFC 3260, IETF RFC 4566, IETF RFC 3840, IETF RFC 6795, IETF Draft draft-mccann-session-policy-framework-using-eap, GSMA PRD IR.92, and GSMA PRD IR.94.

In an embodiment, a method on a UE is provided. The method comprises creating, by the UE, at least one routing policy based on at least one set of IMS service transport rules; communicating, by an upper protocol layer of the UE, information regarding the at least one routing policy to a lower protocol layer of the UE; and transmitting, by the lower protocol layer of the UE, data to an IMS network using an access technology or PDN Connection, according to the at least one routing policy.

In another embodiment, a UE is provided. The UE comprises a memory containing instructions and a processor coupled to the memory. The processor is configured to execute the instructions such that the UE creates at least one routing policy based on at least one set of IMS service transport rules, and such that an upper protocol layer of the UE communicates information regarding the at least one routing policy to a lower protocol layer of the UE, and such that the lower protocol layer of the UE transmits data to an IMS network using an access technology or PDN Connection, according to the at least one routing policy.

In another embodiment, a computer-readable medium is provided. The computer-readable medium contains instructions that, when executed by a processor cause a UE to create at least one routing policy based on at least one set of IMS service transport rules, and cause an upper protocol layer of the UE to communicate information regarding the at least one routing policy to a lower protocol layer of the UE, and cause the lower protocol layer of the UE to transmit data to an IMS network using an access technology or PDN Connection, according to the at least one routing policy.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method on a user equipment (UE), the method comprising:
receiving, by the UE from a network, at least one set of Internet Protocol (IP) Multimedia Subsystem (IMS) service transport rules associated with at least one routing policy;
transmitting, by the UE, data to an IMS network using an access technology or Packet Data Network (PDN) Connection, wherein the access technology or PDN Connection used is according to the at least one routing policy; and
when the at least one set of IMS service transport rules contains an indication regarding a "Data Off" mode for the UE, indicating whether one or more IMS services are allowed or prohibited for one or more transports identified in the IMS service transport rules.

2. The method of claim 1, wherein the at least one routing policy includes at least one of a routing policy for a control plane or a user plane.

3. The method of claim 1, wherein the at least one routing policy includes at least one policy for a user plane established between the UE and a network responsive to determining that there is user plane data to transport after a Session Initiation Protocol (SIP) session is established.

4. The method of claim 3, wherein the at least one policy ensures IP data flows over the user plane are uniquely identified.

5. The method of claim 3, wherein the at least one routing policy is based on Service Description Protocol (SDP) information related to the SIP session, and wherein the SDP information includes an indication of one or more ports to be used for transporting media on the user plane of the SIP session.

6. The method of claim 1, further comprising communicating, by an upper protocol layer of the UE, information regarding the at least one routing policy to a lower protocol layer of the UE, wherein the upper protocol layer communicates the at least one routing policy to the lower protocol layer using new or enhanced ATtention (AT) commands.

7. The method of claim 1, wherein the at least one set of IMS service transport rules contains an indication indicating whether the UE is allowed or prohibited to use one or more transports for one or more IMS services identified in the IMS service transport rules.

8. A non-transitory computer-readable medium containing instructions executable by:
receiving, by a user equipment (UE) from a network, at least one set of Internet Protocol (IP) Multimedia Subsystem (IMS) service transport rules associated with at least one routing policy;
transmitting, by the UE, data to an IMS network using an access technology or Packet Data Network (PDN) Connection, wherein the access technology or PDN Connection used is according to the at least one routing policy; and
when the at least one set of IMS service transport rules contains an indication regarding a "Data Off" mode for the UE, indicating whether one or more IMS services are allowed or prohibited for one or more transports identified in the IMS service transport rules.

9. The non-transitory computer-readable medium of claim 8, wherein the at least one routing policy includes at least one of a routing policy for a control plane or a user plane.

10. The non-transitory computer-readable medium of claim 8, wherein the at least one routing policy includes at least one policy for a user plane established between the UE and a network responsive to determining that there is user plane data to transport after a Session Initiation Protocol (SIP) session is established.

11. The non-transitory computer-readable medium of claim 10, wherein the at least one policy ensures IP data flows over the user plane are uniquely identified.

12. The non-transitory computer-readable medium of claim 10, wherein the at least one routing policy is based on Service Description Protocol (SDP) information related to the SIP session, and wherein the SDP information includes an indication of one or more ports to be used for transporting media on the user plane of the SIP session.

13. The non-transitory computer-readable medium of claim 8, the method further comprising communicating, by an upper protocol layer of the UE, information regarding the at least one routing policy to a lower protocol layer of the UE, wherein the upper protocol layer communicates the at least one routing policy to the lower protocol layer using new or enhanced ATtention (AT) commands.

14. The non-transitory computer-readable medium of claim 8, wherein the at least one set of IMS service transport rules contains an indication indicating whether the UE is allowed or prohibited to use one or more transports for one or more IMS services identified in the IMS service transport rules.

15. A method on a network, the method comprising:
sending, by the network to a user equipment (UE), at least one set of Internet Protocol (IP) Multimedia Subsystem (IMS) service transport rules associated with at least one routing policy;
receiving, by the network from the UE, data in an IMS network using an access technology or Packet Data Network (PDN) Connection, wherein the access technology or PDN Connection used is according to the at least one routing policy; and
when the at least one set of IMS service transport rules contains an indication regarding a "Data Off" mode for the UE, indicating whether one or more IMS services are allowed or prohibited for one or more transports identified in the IMS service transport rules.

16. The method of claim 15, wherein the at least one routing policy includes at least one of a routing policy for a control plane or a user plane.

17. The method of claim 15, wherein the at least one routing policy includes at least one policy for a user plane established between the UE and a network responsive to determining that there is user plane data to transport after a Session Initiation Protocol (SIP) session is established.

18. The method of claim 17, wherein the at least one policy ensures IP data flows over the user plane are uniquely identified.

19. The method of claim 17, wherein the at least one routing policy is based on Service Description Protocol (SDP) information related to the SIP session, and wherein the SDP information includes an indication of one or more ports to be used for transporting media on the user plane of the SIP session.

20. The method of claim 15, further comprising communicating, by an upper protocol layer of the UE, information regarding the at least one routing policy to a lower protocol layer of the UE, wherein the upper protocol layer communicates the at least one routing policy to the lower protocol layer using new or enhanced ATtention (AT) commands.

21. The method of claim 15, wherein the at least one set of IMS service transport rules contains an indication indicating whether the UE is allowed or prohibited to use one or more transports for one or more IMS services identified in the IMS service transport rules.

* * * * *